United States Patent
Ozawa et al.

(10) Patent No.: US 10,755,741 B2
(45) Date of Patent: Aug. 25, 2020

(54) MAGNETIC TAPE APPARATUS

(71) Applicant: FUJIFILM Corporation, Tokyo (JP)

(72) Inventors: Eiki Ozawa, Minami-ashigara (JP); Norihito Kasada, Minami-ashigara (JP); Atsushi Musha, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/456,780

(22) Filed: Jun. 28, 2019

(65) Prior Publication Data
US 2020/0005827 A1    Jan. 2, 2020

(30) Foreign Application Priority Data

Jun. 29, 2018  (JP) .................................. 2018-125575
May 29, 2019  (JP) .................................. 2019-100044

(51) Int. Cl.
*G11B 5/09* (2006.01)
*G11B 20/10* (2006.01)
*G11B 5/008* (2006.01)

(52) U.S. Cl.
CPC .... *G11B 20/10046* (2013.01); *G11B 5/00813* (2013.01)

(58) Field of Classification Search
None
See application file for complete search history.

(56) References Cited

U.S. PATENT DOCUMENTS

| | | | | |
|---|---|---|---|---|
| 4,590,524 A | * | 5/1986 | Okamoto | G11B 20/10527 360/32 |
| 4,727,438 A | * | 2/1988 | Juso | G11B 5/584 360/25 |
| 4,988,562 A | * | 1/1991 | Ryoke | G11B 5/708 428/323 |
| 5,305,159 A | * | 4/1994 | Sakai | G11B 5/59655 360/77.02 |
| 5,544,140 A | * | 8/1996 | Seagrave | G11B 20/1806 360/32 |
| 5,606,469 A | * | 2/1997 | Kosugi | G11B 5/59633 360/75 |
| 6,033,760 A | * | 3/2000 | Wakana | G11B 5/70 428/141 |

(Continued)

FOREIGN PATENT DOCUMENTS

JP    2011-134372 A    7/2011
JP    2016-110680 A    6/2016

*Primary Examiner* — Peter Vincent Agustin
(74) *Attorney, Agent, or Firm* — Sughrue Mion, PLLC

(57) ABSTRACT

A magnetic tape apparatus includes a magnetic tape, a reading element unit and an extraction unit, in which a coefficient of friction measured regarding a base portion of a surface of the magnetic layer is equal to or smaller than 0.35, the reading element unit includes a plurality of reading elements each of which reads data by a linear scanning method from a specific track region including a reading target track in a track region included in the magnetic tape, and the extraction unit performs a waveform equalization process according to a deviation amount between positions of the magnetic tape and the reading element unit, with respect to each reading result for each reading element, to extract data derived from the reading target track from the reading result.

17 Claims, 16 Drawing Sheets

(56) References Cited

U.S. PATENT DOCUMENTS

| | | | |
|---|---|---|---|
| 6,579,592 B1* | 6/2003 | Matsubaguchi | G11B 5/70 |
| | | | 428/141 |
| 7,755,863 B2 | 7/2010 | Neumann et al. | |
| 9,928,854 B1* | 3/2018 | Jury | G11B 5/09 |
| 2003/0095353 A1* | 5/2003 | Nakao | G11B 5/584 |
| | | | 360/75 |
| 2006/0068232 A1* | 3/2006 | Mikamo | G11B 5/70626 |
| | | | 428/842.9 |
| 2006/0119969 A1* | 6/2006 | Hutchins | G11B 5/02 |
| | | | 360/65 |
| 2014/0272474 A1* | 9/2014 | Kasada | G11B 5/7085 |
| | | | 428/842.8 |
| 2015/0029608 A1* | 1/2015 | Mathew | G11B 20/10268 |
| | | | 360/30 |
| 2016/0093322 A1* | 3/2016 | Kasada | G11B 5/70 |
| | | | 428/840.2 |
| 2016/0171993 A1 | 6/2016 | Okubo | |
| 2017/0004856 A1* | 1/2017 | Tada | G11B 5/842 |
| 2017/0372738 A1* | 12/2017 | Kasada | G11B 5/70605 |
| 2018/0082710 A1* | 3/2018 | Tada | G11B 5/845 |
| 2018/0358044 A1* | 12/2018 | Shirata | G11B 5/70642 |
| 2018/0358046 A1* | 12/2018 | Shirata | G11B 5/70642 |
| 2020/0005827 A1* | 1/2020 | Ozawa | G11B 5/00813 |

* cited by examiner

MAGNETIC TAPE APPARATUS

CROSS-REFERENCE TO RELATED APPLICATIONS

This application claims priority under 35 U.S.C 119 to Japanese Patent Application No. 2018-125575 filed on Jun. 29, 2018 and Japanese Patent Application No. 2019-100014 filed on May 29, 2019. Each of the above applications is hereby expressly incorporated by reference, in its entirety, into the present application.

BACKGROUND OF THE INVENTION

1. Field of the Invention

The present invention relates to a magnetic tape apparatus.

2. Description of the Related Art

A magnetic recording and reproducing apparatus which performs recording of data on a magnetic recording medium and/or reading (reproducing) of the recorded data is widely divided into a magnetic disk apparatus and a magnetic tape apparatus. A representative example of the magnetic disk apparatus is a hard disk drive (HDD). In the magnetic disk apparatus, a magnetic disk is used as the magnetic recording medium. Meanwhile, in the magnetic tape apparatus, a magnetic tape is used as the magnetic recording medium.

In both of the magnetic disk apparatus and the magnetic tape apparatus, it is preferable to narrow a recording track width, in order to increase recording capacity (increase capacity). However, the recording track width is narrowed, a signal of an adjacent track is easily mixed with a signal of a reading target track during the reproducing, and accordingly, it is difficult to maintain reproducing quality such as a signal-to-noise ratio (SNR). In regard to this point, in recent years, it is proposed to improve reproducing quality by reading a signal of a recording track by a plurality of reading elements (also referred to as "reproducing elements") two-dimensionally (for example, see JP2016-110680A, JP2011-134372A, and U.S. Pat. No. 7,755,863B). In a case where the reproducing quality can be improved by doing so, the reproducing quality can be maintained, even in a case where the recording track width is narrowed, and accordingly, it is possible to increase recording capacity by narrowing the recording track width.

SUMMARY OF THE INVENTION

In JP2016-110680A and JP2011-134372A, studies regarding a magnetic disk apparatus are conducted. Meanwhile, in recent years, a magnetic tape is receiving attention as a data storage medium for storing a large content of data for a long period of time. However, the magnetic tape apparatus is a sliding type apparatus in which data reading (reproducing) is performed due to a contact and sliding between the magnetic tape and a reading element. Accordingly, a relational position between the reading element and a reading target track easily changes during the reproducing, and the reproducing quality tends to be hardly improved, compared to a magnetic disk apparatus. U.S. Pat. No. 7,755,863B discloses the description regarding the magnetic tape apparatus (tape drive), but does not disclose specific means for improving the reproducing quality of the magnetic tape apparatus.

One aspect of the invention provides a magnetic tape apparatus capable of improving the reproducing quality.

According to one aspect of the invention, there is provided a magnetic tape apparatus comprising: a magnetic tape; a reading element unit; and an extraction unit, in which the magnetic tape includes a non-magnetic support, and a magnetic layer including a ferromagnetic powder and a binding agent on the non-magnetic support, a coefficient of friction measured regarding a base portion of a surface of the magnetic layer (also referred to as a "base friction") is equal to or smaller than 0.35, the reading element unit includes a plurality of reading elements each of which reads data by a linear scanning method from a specific track region including a reading target track in a track region included in the magnetic tape, and the extraction unit performs a waveform equalization process according to a deviation amount between positions of the magnetic tape and the reading element unit, with respect to each reading result for each reading element, to extract data derived from the reading target track from the reading result.

In one aspect, parts of the plurality of reading elements may be overlapped each other in a running direction of the magnetic tape.

In one aspect, the specific track region may be a region including the reading target track and adjacent tracks which are adjacent to the reading target track, and each of the plurality of reading elements may straddle over both of the reading target track and the adjacent track, in a case where a positional relationship with the magnetic tape is changed.

In one aspect, the plurality of reading elements may be disposed in a line in a state of being adjacent to each other, in a width direction of the magnetic tape.

In one aspect, the plurality of reading elements may fall in the reading target track in a width direction of the magnetic tape.

In one aspect, the waveform equalization process may be performed by using a tap coefficient determined in accordance with the deviation amount.

In one aspect, regarding each of the plurality of reading elements, a ratio between an overlapping region with the reading target track and an overlapping region with an adjacent track which is adjacent to the reading target track may be specified from the deviation amount, and the tap coefficient may be determined in accordance with the specified ratio.

In one aspect, the deviation amount may be determined in accordance with a result obtained by reading a servo pattern applied to the magnetic tape in advance, by a servo element.

In one aspect, a reading operation by the reading element unit may be performed synchronously with a reading operation by the servo element.

In one aspect, the extraction unit may include a two-dimensional finite impulse response (FIR) filter, and the two-dimensional FIR filter may compose each result obtained by performing the waveform equalization process with respect to each reading result for each reading element, to extract data derived from the reading target track from the reading result.

In one aspect, the plurality of reading elements may be a pair of reading elements.

In one aspect, the base friction may be 0.10 to 0.35.

According to one aspect of the invention, it is possible to provide a magnetic tape apparatus capable of reproducing data recorded on a magnetic tape with high reproducing quality.

DESCRIPTION OF THE PREFERRED EMBODIMENTS

A magnetic tape apparatus according to one aspect of the invention includes a magnetic tape, a reading element unit, and an extraction unit.

Figure 15:
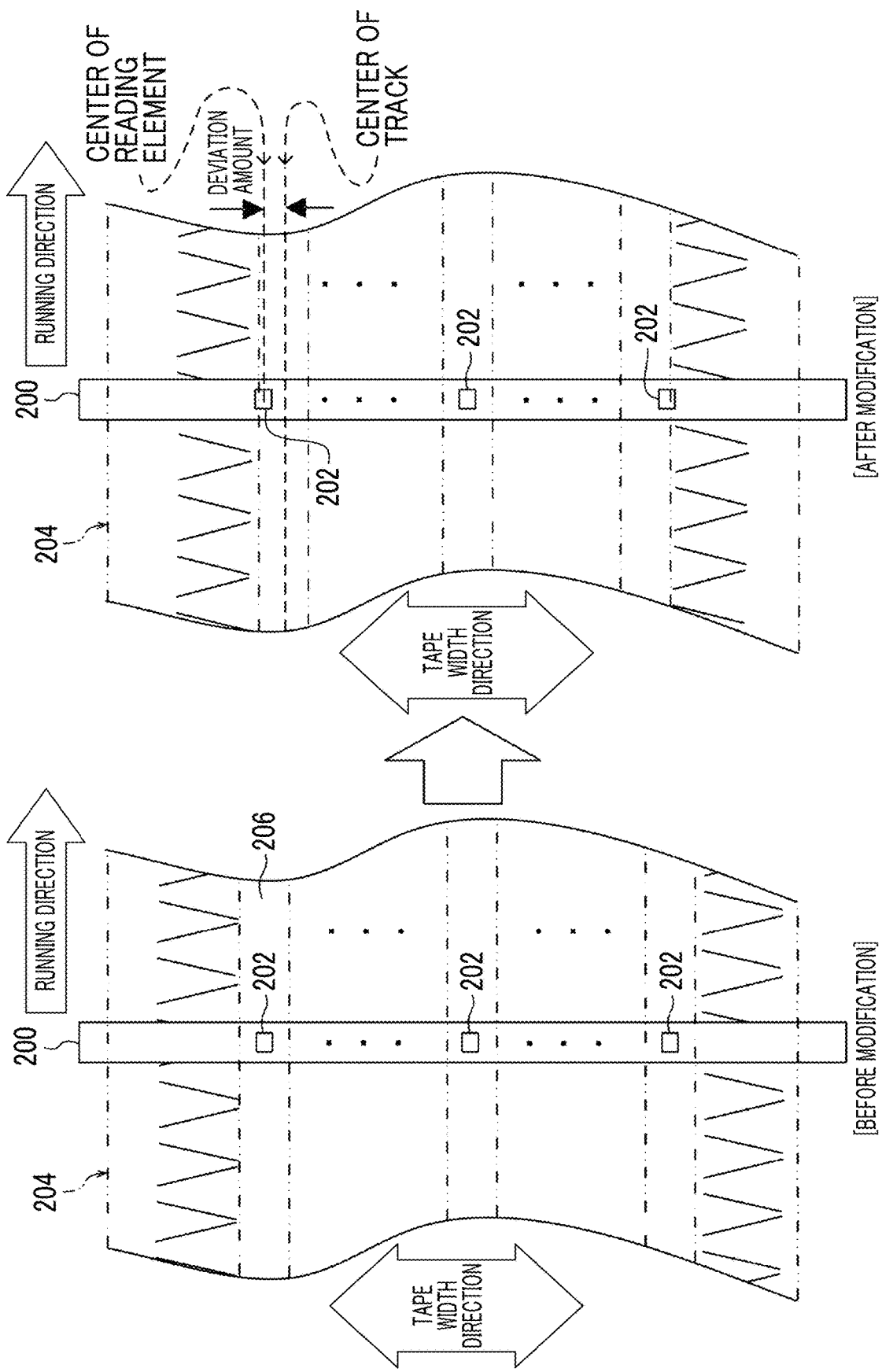
FIG. 15 is a conceptual view provided for description of a first example of the related art.

Regarding the reading of data from the magnetic tape, in the example of the related art shown in FIG. 15, an elongated reading head 200 comprises a plurality of reading elements 202 along a longitudinal direction. In a magnetic tape 204, a plurality of tracks 206 are formed. The reading head 200 is disposed so that the longitudinal direction coincides with a width direction of the magnetic tape 204. In addition, each of the plurality of reading elements 202 is allocated for each of the plurality of tracks 206 in a one-to-one relation, and reads data from the track 206 at a position faced.

However, in general, the magnetic tape 204 expands and contracts due to time elapse, an environment, a change of a tension, and the like. In a case where the magnetic tape expands and contracts in a width direction of the magnetic tape 204, the center of the reading element 202 disposed on both end in the longitudinal direction in the reading head 200 is deviated from the center of the track 206. In a case where the magnetic tape 204 is modified due to the expansion and contraction in a width direction, particularly, the reading elements 202 closer to both end of the reading head 200, among the plurality of reading elements 202, receive a greater effect of off-track. In order to reduce the effect of the off-track, for example, a method of applying a surplus width to the width of the track 206 has been considered. However, as the width of the track 206 increases, a recording capacity of the magnetic tape 204 decreases.

Figure 16:
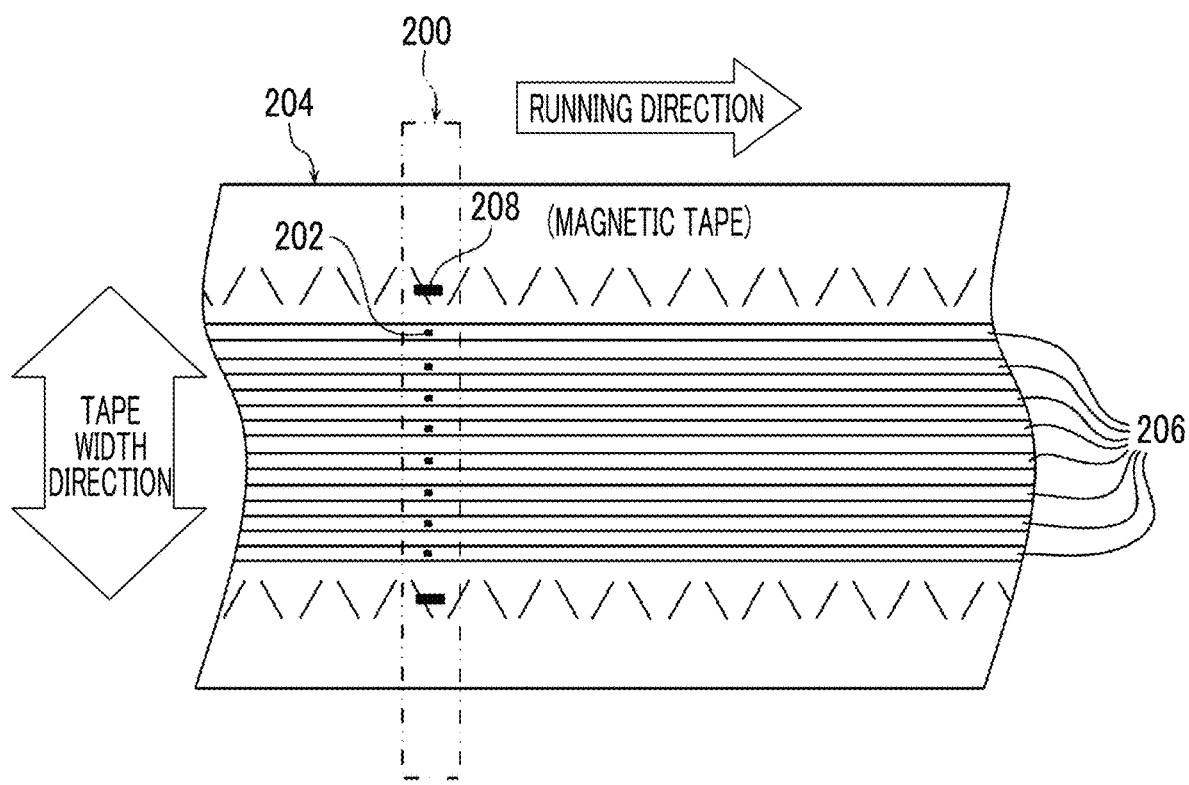
FIG. 16 is a conceptual view provided for description of a second example of the related art.

In addition, as shown in the example of the related art shown in FIG. 16, in general, a servo element 208 is provided in the reading head 200. A servo pattern which is applied to the magnetic tape 204 in advance along a running direction of the magnetic tape 204 is read by the servo element 208. A control device (not shown) specifies that which position on the magnetic tape 204 the reading element 202 runs on, for example, at regular time interval, from the servo signal obtained by reading the servo pattern by the servo element 208. Accordingly, a position error signal (PES) in a width direction of the magnetic tape 204 is detected by the control device.

As described above, in a case where the control device specifies the running position of the reading element 202, a feedback control is performed with respect to an actuator (not shown) for the reading head by the control device based on the specified running position, and accordingly, the tracking of the magnetic tape 204 in the width direction is realized.

However, although the tracking is performed, sharp vibration, a high frequency component of jitter, and the like are factors of an increase in PES, and this causes a deterioration in reproducing quality of data read from a reading target track.

On the other hand, in the magnetic tape apparatus according to one aspect of the invention, the reading element unit includes a plurality of reading elements each of which reads data by a linear scanning method from a specific track region including a reading target track in a track region included in the magnetic tape. The extraction unit performs a waveform equalization process according to a deviation amount between positions of the magnetic tape and the reading element unit, with respect to each reading result for each reading element, to extract data derived from the reading target track from the reading result. Therefore, according to the magnetic tape apparatus, it is possible to increase the reproducing quality of data read from the reading target track, compared to a case where data is read only by a single reading element from the reading target track by a linear scanning method. As a result, it is possible to increase an acceptable amount of the deviation amount (track off-set amount) capable of ensuring excellent reproducing quality.

In addition, the deviation amount is generally detected by the reading of the servo pattern. However, in practice, the positional change may occur on a cycle shorter than a cycle on which the servo pattern is formed. With respect to the reading result obtained by reading at a portion where the positional change on such a short cycle occurs, the waveform equalization process according to the deviation amount may not be always the optimal waveform equalization process. With respect to this, in a case where the positional change on such a short cycle can be prevented, more suitable waveform equalization process can be performed with respect to the reading result obtained by reading at each portion. As a result, it is possible to increase the acceptable amount of the deviation amount capable of ensuring excellent reproducing quality by the waveform equalization process.

As described above, an increase in acceptable amount of the deviation amount capable of ensuring excellent reproducing quality can contribute to the reproducing with high reproducing quality (for example, high SNR or low error rate), even in a case where a track margin (recording track width–reproducing element width) is decreased. A decrease in track margin can contribute to an increase in number of recording tracks capable of being disposed in a width direction of the magnetic tape by decreasing the recording track width, that is, realization of high capacity.

With respect to the point described above, it is considered that the base friction equal to or smaller than 0.35 of the magnetic tape which performs the reading of data in the magnetic tape apparatus, contributes to prevention of the positional change on the short cycle. This point will be further described later.

Hereinafter, the magnetic tape apparatus will be described later in detail. Hereinafter, the magnetic tape apparatus may be described with reference to the drawings. However, the magnetic tape apparatus is not limited to the aspect shown in the drawings.

Configuration of Magnetic Tape Apparatus and Magnetic Tape Reading Process

Figure 1:
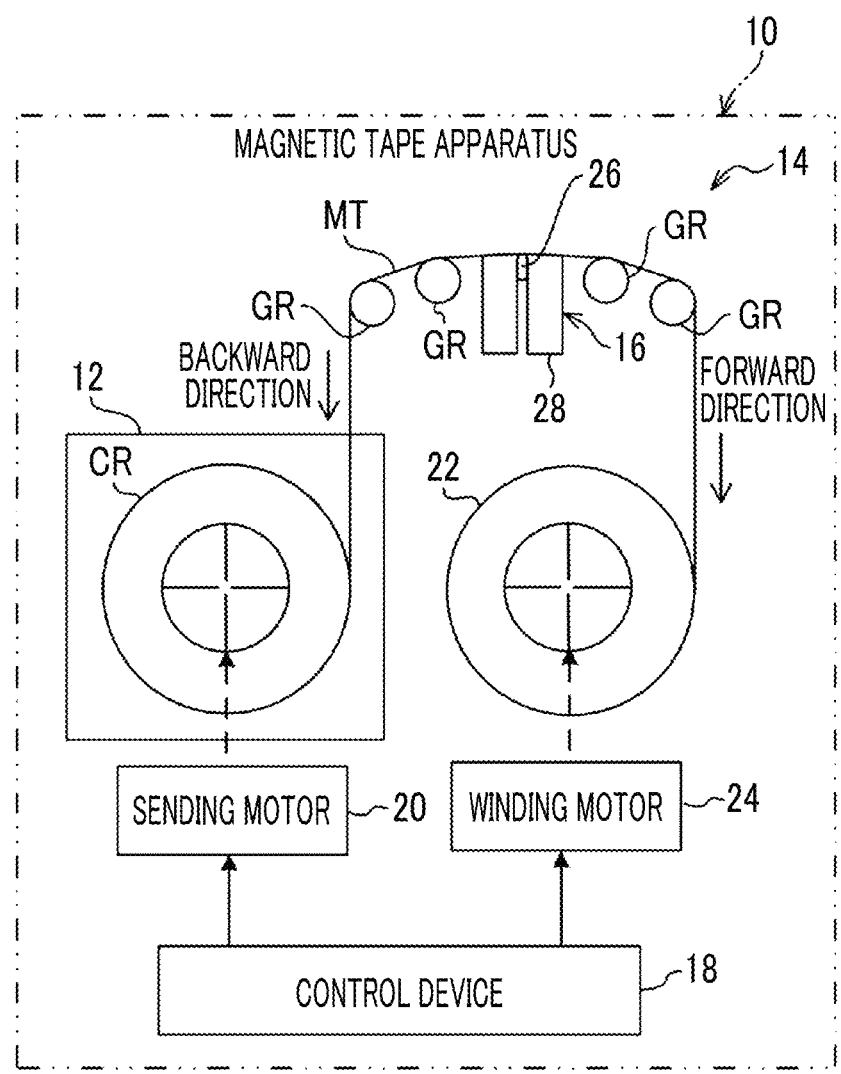
FIG. 1 is a schematic configuration view showing an example of the entire configuration of a magnetic tape apparatus.

As an example shown in FIG. 1, a magnetic tape apparatus 10 comprises a magnetic tape cartridge 12, a transportation device 14, a reading head 16, and a control device 18.

The magnetic tape apparatus 10 is an apparatus which extracts a magnetic tape MT from the magnetic tape cartridge 12 and reads data from the extracted magnetic tape MT by using the reading head 16 by a linear scanning method. The reading of data can also be referred to as reproducing of data.

The control device 18 controls the entire magnetic tape apparatus 10. In one aspect, the control performed by the control device 18 can be realized with an application specific integrated circuit (ASIC). In addition, in one aspect, the control performed by the control device 18 can be realized with a field-programmable gate array (FPGA). The control performed by the control device 18 may be realized with a computer including a central processing unit (CPU), a read only memory (ROM), and a random access memory (RAM). Further, the control may be realized with a combination of two or more of AISC, FPGA, and the computer.

The transportation device 14 is a device which selectively transports the magnetic tape MT in a forward direction and a backward direction, and comprises a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. The rotation rate, the rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension in which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In one aspect, the tension of the magnetic tape MT is controlled by controlling the rotation rate, the rotation torque, and the like of the sending motor 20 and the winding motor 24. In addition, in one aspect, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by separately disposing the plurality of guide rollers GR on positions crossing the reading head 16 between the magnetic tape cartridge 12 and the winding reel 22.

The reading head 16 comprises a reading unit 26 and a holder 28. The reading unit 26 is held by the holder 28 so as to come into contact with the magnetic tape MT during the running.

Figure 2:
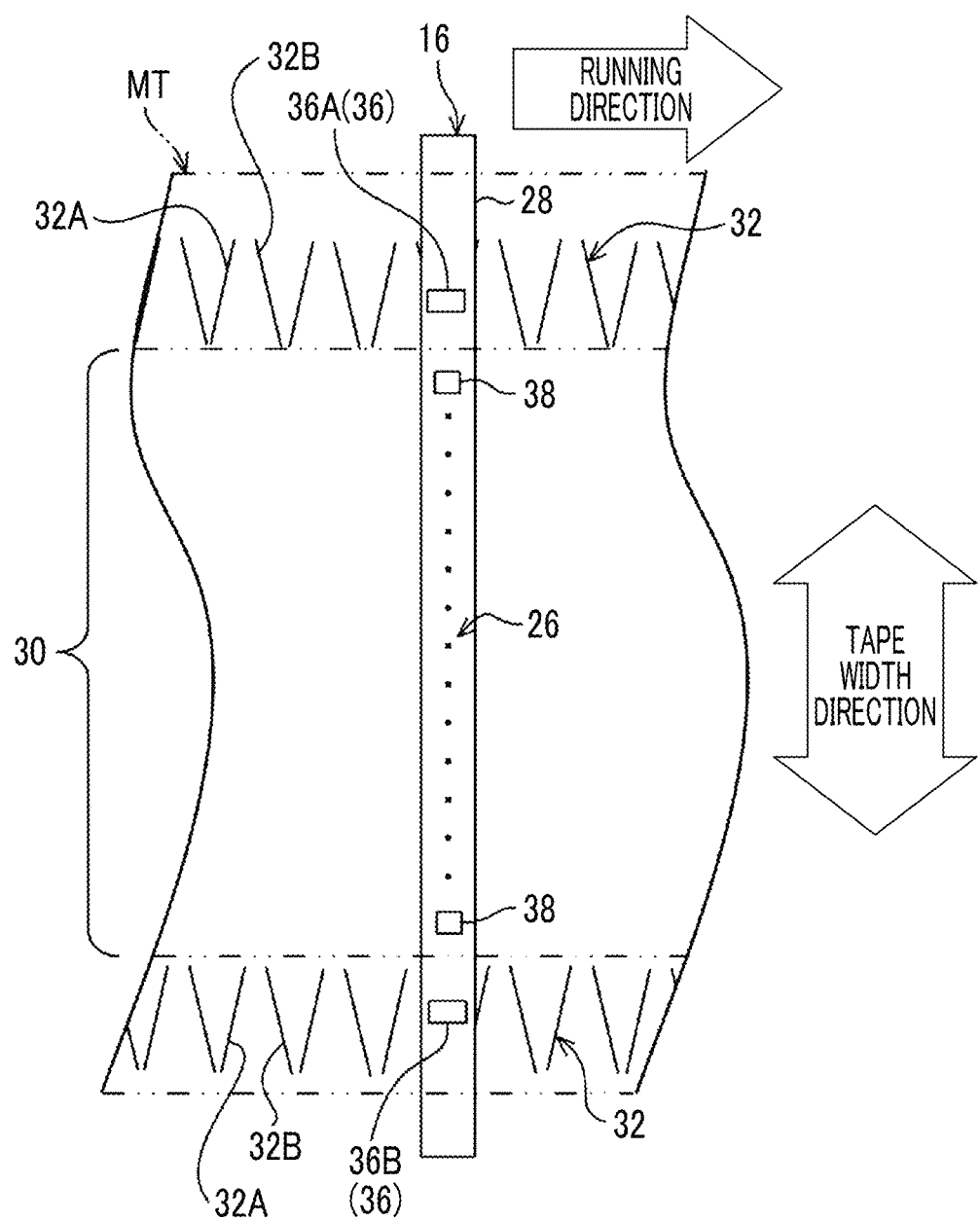
FIG. 2 is a schematic plan view showing an example of a schematic configuration in a plan view of a reading head and a magnetic tape included in the magnetic tape apparatus.

As an example shown in FIG. 2, the magnetic tape MT comprises a track region 30 and a servo pattern 32. The servo pattern 32 is a pattern used for detection of the position of the reading head 16 on the magnetic tape MT. The servo pattern 32 is a pattern in which a first diagonal line 32A at a first predetermined angle (for example, 95 degrees) and a second diagonal line 32B at a second predetermined angle (for example, 85 degrees) are alternately disposed on both end portions in a tape width direction at a constant pitch (cycle) along a running direction of the magnetic tape MT. The "tape width direction" here indicates a width direction of the magnetic tape MT.

The track region 30 is a region where the data which is a reading target is written, and is formed on the center of the magnetic tape MT in the tape width direction. The "center in the tape width direction" here indicates, for example, a region between the servo pattern 32 on one end portion and the servo pattern 32 on the other end portion of the magnetic tape MT in the tape width direction. Hereinafter, for convenience of description, the "running direction of the magnetic tape MT" is simply referred to as the "running direction".

The reading unit 26 comprises a servo element pair 36 and a plurality of reading element units 38. The holder 28 is formed to be elongated in the tape width direction, and a total length of the holder 28 in the longitudinal direction is longer than the width of the magnetic tape MT. The servo element pair 36 are disposed on both end portions of the holder 28 in the longitudinal direction, and the plurality of reading element units 38 are disposed on the center of the holder 28 in the longitudinal direction.

The servo element pair 36 comprise servo elements 36A and 36B. The servo element 36A is disposed on a position facing the servo pattern 32 on one end portion of the magnetic tape MT in the tape width direction, and the servo element 36B is disposed on a position facing the servo pattern 32 on the other end portion of the magnetic tape MT in the tape width direction.

In the holder 28, the plurality of reading element units 38 are disposed between the servo element 36A and the servo element 36B along the tape width direction. The track region 30 comprises the plurality of tracks at regular interval in the tape width direction, and in a default state of the magnetic tape apparatus 10, each of the plurality of reading element units 38 is disposed to face each track in the track region 30.

Thus, since the reading unit 26 and the magnetic tape MT relatively move linearly along the longitudinal direction of the magnetic tape MT, the data of each track in the track region 30 is read by each reading element unit 38 at the corresponding position among the plurality of reading element units 38 by the linear scanning method. In addition, in the linear scanning method, the servo patterns 32 are read by the servo element pair 36 synchronously with the reading operation of the reading element units 38. That is, in one aspect of the linear scanning method, the reading with respect to the magnetic tape MT is performed in parallel by the plurality of reading element units 38 and the servo element pair 36.

Here, "each track in the track region 30" here indicates a track included in "each of a plurality of specific track region including each reading target track in the track region included in the magnetic tape".

The "default state of the magnetic tape apparatus 10" indicates a state where the magnetic tape MT is not deformed and a positional relationship between the magnetic tape MT head the reading head 16 is a correct positional relationship. Here, the "correct positional relationship" indicates a positional relationship in which the center of the magnetic tape MT in the tape width direction and the center of the reading head 16 in the longitudinal direction coincide with each other.

In one aspect, each of the plurality of reading element unit 38 has the same configuration. Hereinafter, the description will be performed using one of the plurality of reading element unit 38 as an example, for convenience of description. As an example shown in FIG. 3, the reading element unit 38 comprises one pair of reading elements. In the example shown in FIG. 3, "one pair of reading elements" indicate a first reading element 40 and a second reading element 42. Each of the first reading element 40 and the second reading element 42 reads data from a specific track region 31 including a reading target track 30A in the track region 30.

Figure 3:
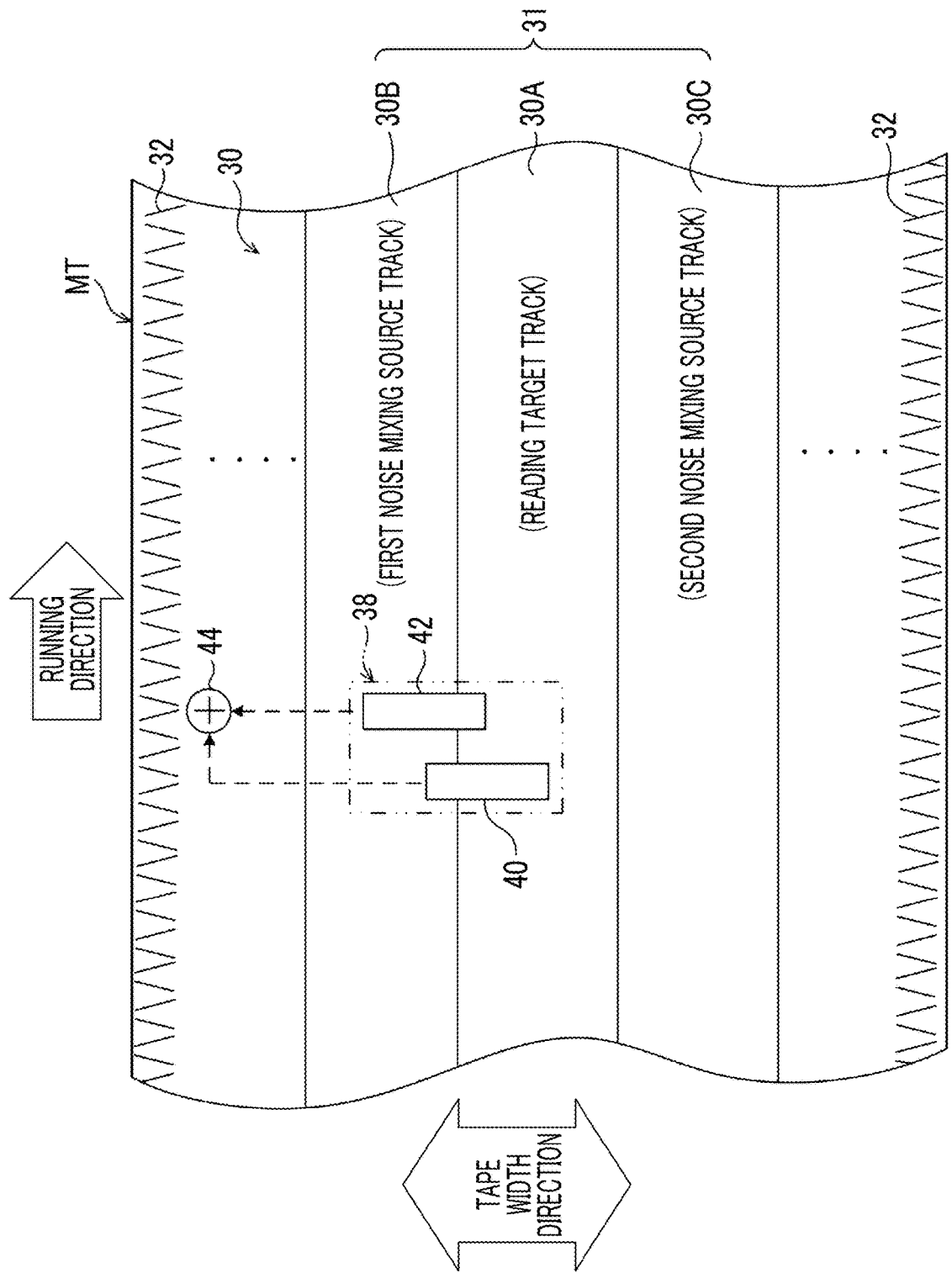
FIG. 3 is a schematic plan view showing an example of a schematic configuration in a plan view of a reading element unit and a magnetic tape.

In the example shown in FIG. 3, for convenience of description, one specific track region 31 is shown. In practice, in general, in the track region 30, a plurality of specific track regions 31 are present, and the reading target track 30A is included in each specific track region 31. The reading element unit 38 is allocated to each of the plurality of specific track regions 31 in a one-to-one manner. Specifically, the reading element unit 38 is allocated to the reading target track 30A in each of the plurality of specific track regions 31 in a one-to-one manner.

The specific track region 31 indicates three adjacent tracks. A first track among the three adjacent tracks is the reading target track 30A in the track region 30. A second track among the three adjacent tracks is a first noise mixing source track 30B which is one adjacent track adjacent to the reading target track 30A. A third track among the three adjacent tracks is a second noise mixing source track 30C which is one adjacent track adjacent to the reading target track 30A. The reading target track 30A is a track at a position facing the reading element unit 38 in the track region 30. That is, the reading target track 30A indicates a track having data to be read by the reading element unit 38.

The first noise mixing source track 30B is a track which is adjacent to the reading target track 30A on one side in the tape width direction and is a mixing source of noise mixed to data read from the reading target track 30A. The second noise mixing source track 30C is a track which is adjacent to the reading target track 30A on the other side in the tape width direction and is a mixing source of noise mixed to data read from the reading target track 30A. Hereinafter, for convenience of description, in a case where it is not necessary to describe the first noise mixing source track 30B and the second noise mixing source track 30C separately, these are referred to as the "adjacent track" without reference numerals.

In one aspect, in the track region 30, the plurality of specific track regions 31 are disposed at regular interval in the tape width direction. For example, in the track region 30, 32 specific track regions 31 are disposed at regular interval in the tape width direction, and the reading element unit 38 is allocated to each specific track region 31 in a one-to-one manner.

The first reading element 40 and the second reading element 42 are disposed at positions a part of which is overlapped in the running direction, in a state of being adjacent in the running direction. In a default state of the magnetic tape apparatus 10, the first reading element 40 is disposed at a position straddling over the reading target track 30A and the first noise mixing source track 30B. In a default state of the magnetic tape apparatus 10, the second reading element 42 is disposed at a position straddling over the reading target track 30A and the first noise mixing source track 30B.

In a default state of the magnetic tape apparatus 10, the area of a portion of the first reading element 40 facing the reading target track 30A is greater than the area of a portion of the first reading element 40 facing the first noise mixing source track 30B, in a plan view. Meanwhile, in a default state of the magnetic tape apparatus 10, the area of a portion of the second reading element 42 facing the first noise mixing source track 30B is greater than the area of a portion of the first reading element 40 facing the reading target track 30A, in a plan view.

Figure 7:
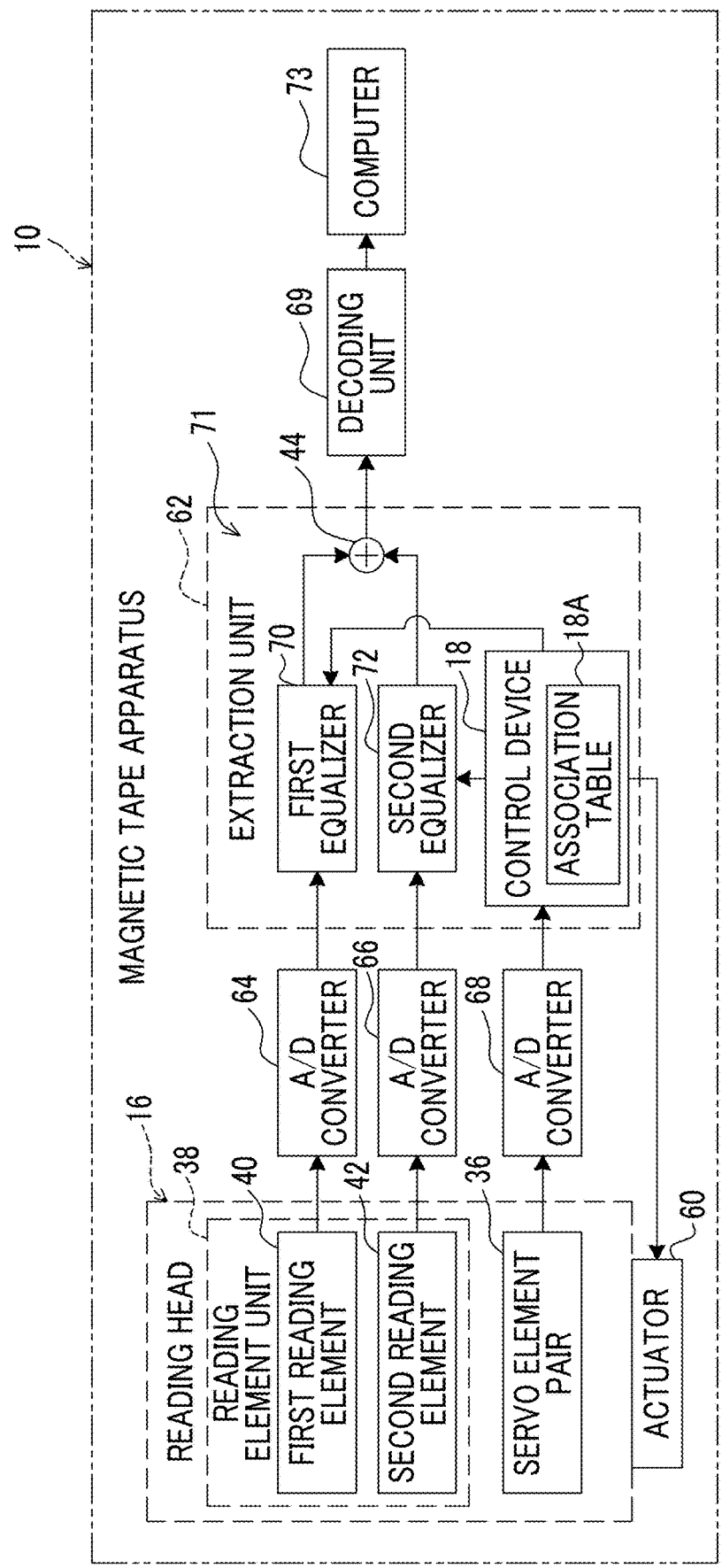
FIG. 7 is a block view showing an example of a main configuration of hardware of an electric system of the magnetic tape apparatus.

The data read by the first reading element 40 is subjected to a waveform equalization process by a first equalizer 70 (see FIG. 7). The data read by the second reading element 42 is subjected to a waveform equalization process by a second equalizer 72 (see FIG. 7). Each data item obtained by performing the waveform equalization process by each of the first equalizer 70 and the second equalizer 72 is added by an adder 44 and composed.

In FIG. 3, the aspect in which the reading element unit 38 includes the first reading element 40 and the second reading element 42 has been described as an example. However, for example, even in a case where only one reading element (hereinafter, also referred to as a single reading element) among a pair of reading elements is used, a signal corresponding to a reproducing signal obtained from the reading element unit 38 is obtained.

Figure 8:
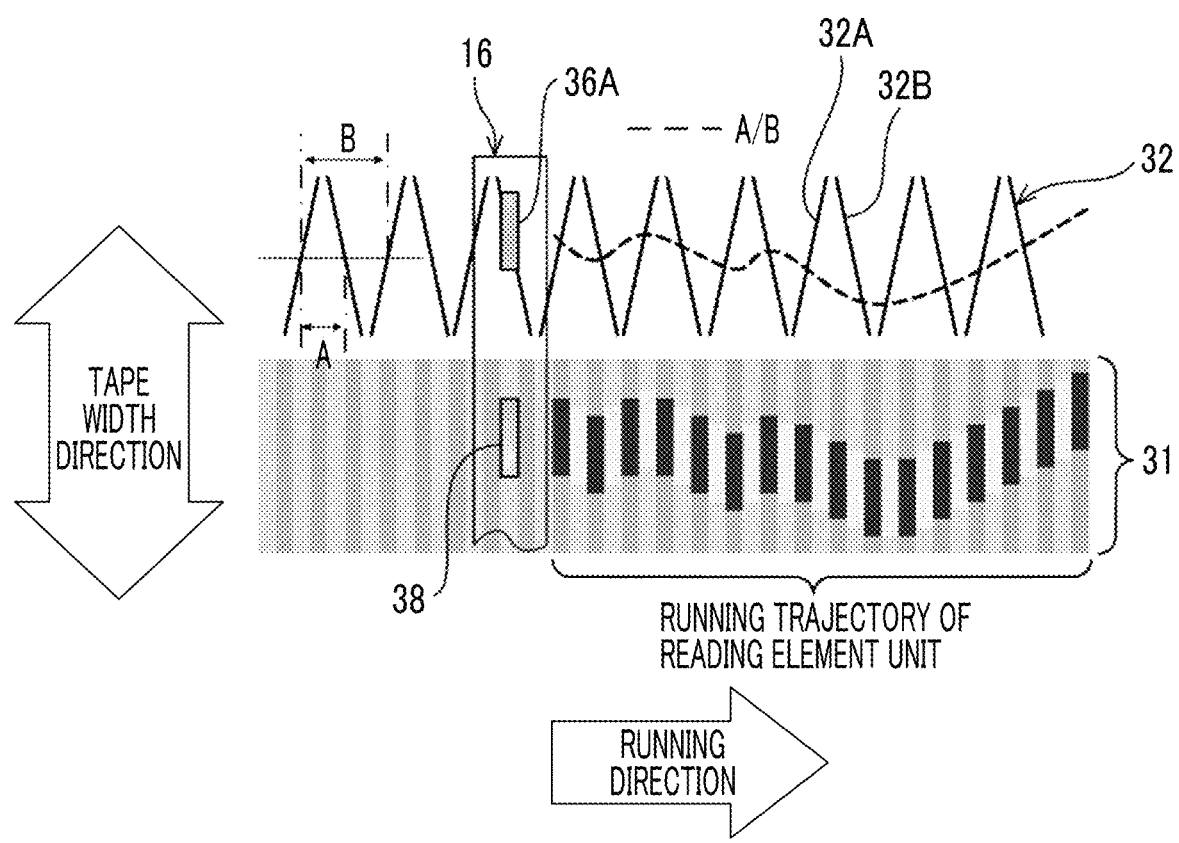
FIG. 8 is a conceptual view provided for description of a method of calculating a deviation amount.

In this case, for example shown in FIG. 8, the reproducing signal obtained from the single reading element is allocated to a plane position on a track calculated from a servo signal obtained by the servo element pair 36 synchronously with the reproducing signal. By repeating this operation while moving the single reading element in the tape width direction, a two-dimensional image of the reproducing signal (hereinafter, simply referred to as a "two-dimensional image") is obtained. Here, a reproducing signal configuring the two-dimensional image or a part of the two-dimensional image (for example, reproducing signal corresponding to the position of the plurality of tracks) is signal corresponding to the reproducing signal obtained from the reading element unit 38.

Figure 17:
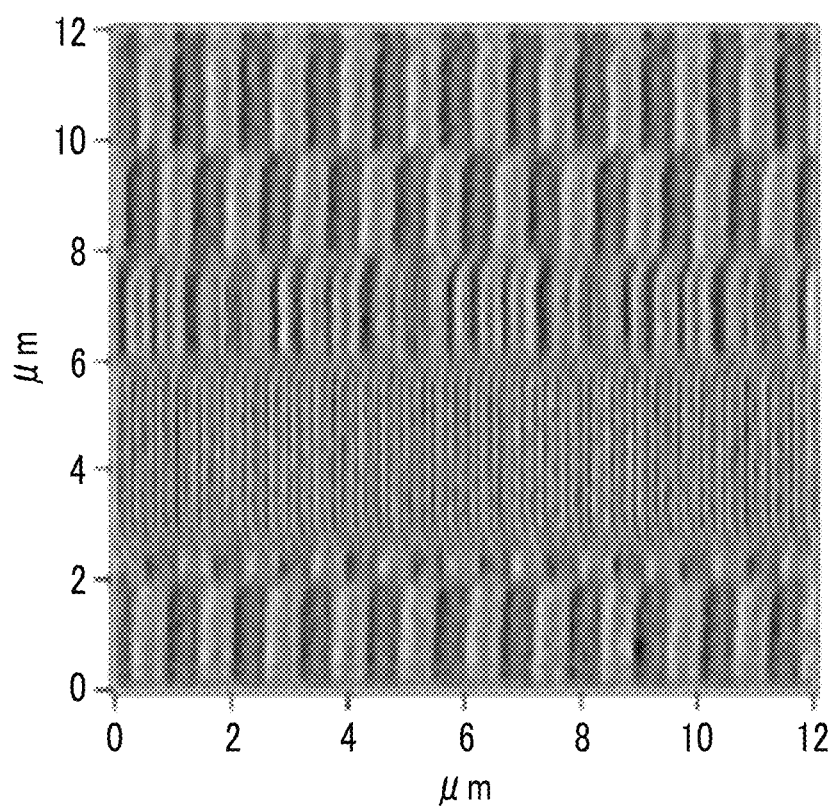
FIG. 17 is a view showing an example of a two-dimensional image of a reproducing signal obtained from a single reading element.

FIG. 17 shows an example of a two-dimensional image of the reproducing signal of the magnetic tape MT in a loop shape (hereinafter, also referred to as a "loop tape") obtained by using a loop tester. Here, the loop tester indicates a device which transports the loop tape in a state where the loop tape is repeatedly in contact with the single reading element, for example. In order to obtain a two-dimensional image in the same manner as in the case of the loop tester, a reel tester may be used or an actual tape drive may be used. The "reel tester" here indicates a device which transports the magnetic tape MT in a reel state, for example.

As described above, even in a case where a head for a magnetic tape of the related art which does not include the reading element unit on which the plurality of reading elements are loaded at adjacent positions is used, the effect according to the technology disclosed in the specification can be quantitatively evaluated. As an example of an index for quantitatively evaluating the effect according to the technology disclosed in the specification, an SNR, an error rate, and the like are used.

Figure 4:
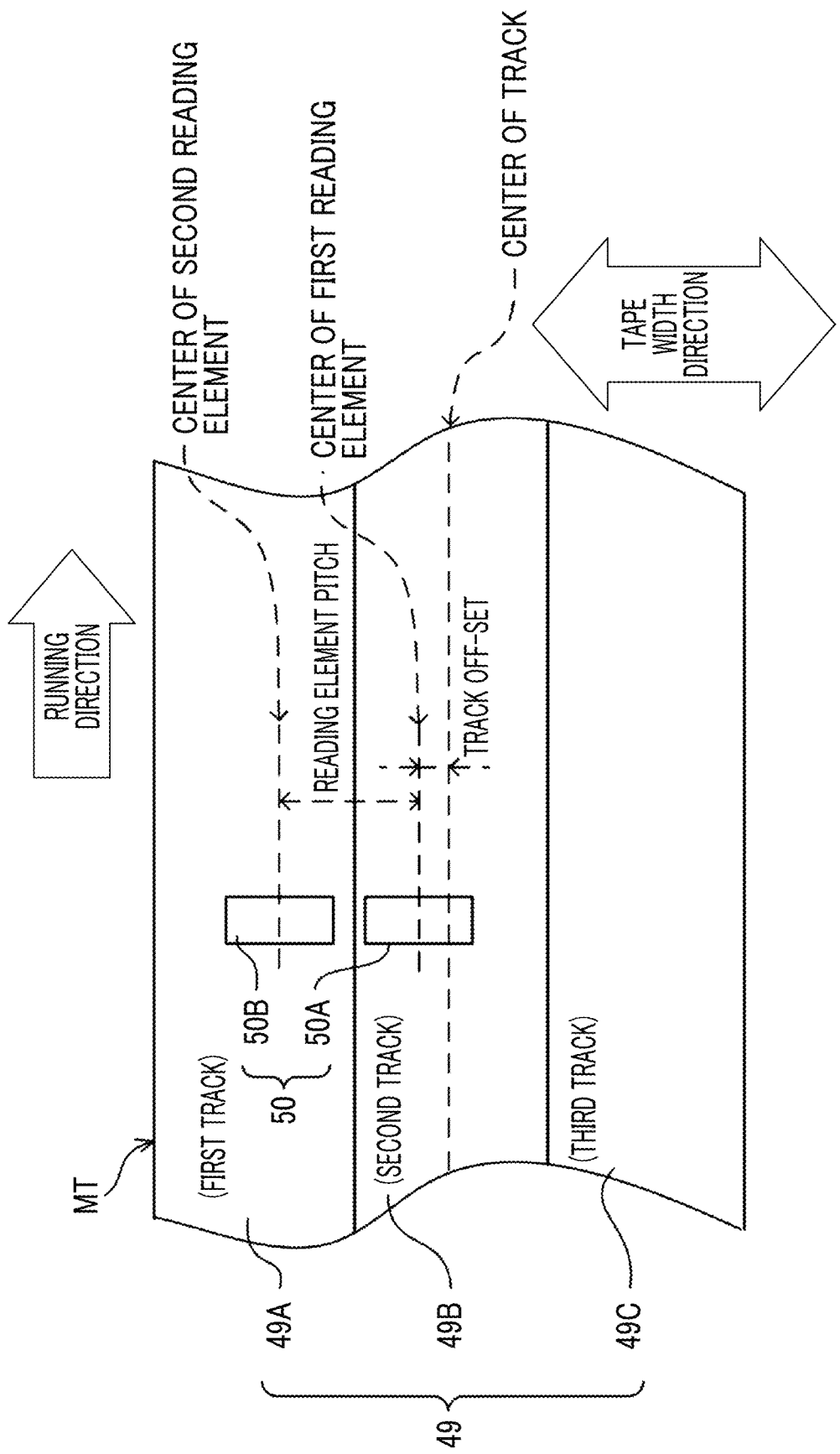
FIG. 4 is a schematic plan view showing an example of a schematic configuration in a plan view of a track region and a reading element pair.
Figure 5:
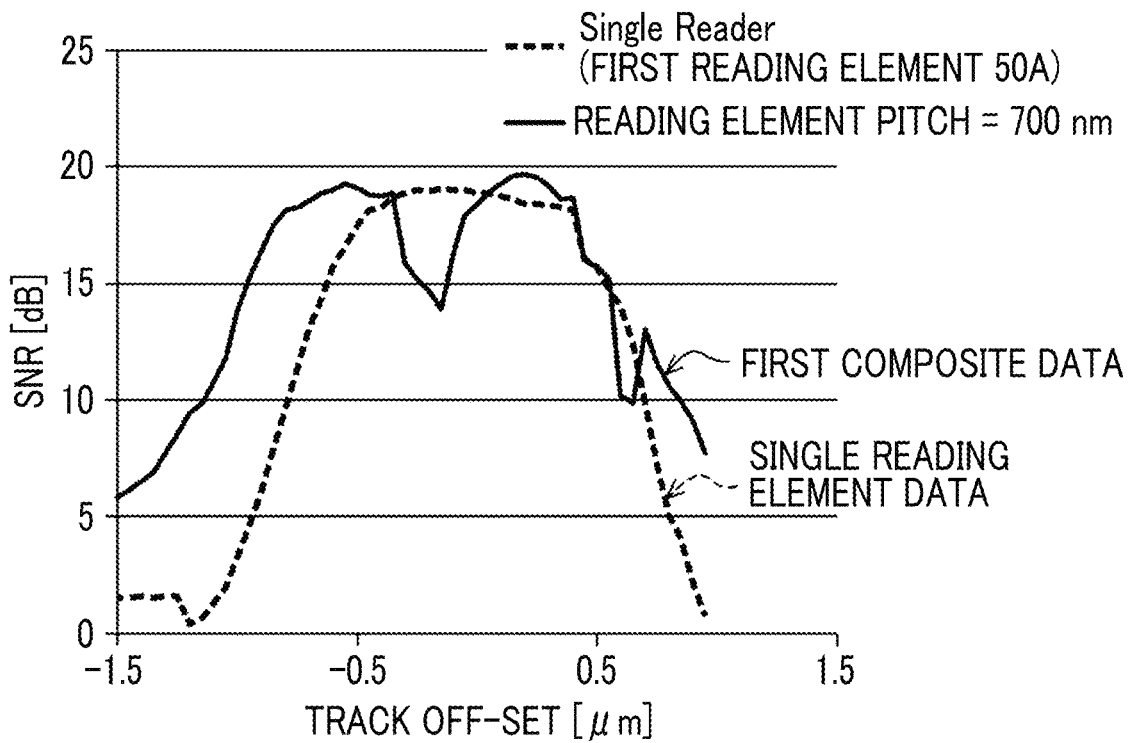
FIG. 5 is a graph showing an example of a correlation between an SNR regarding each of a single reading element data item and a first composite data item under a first condition, and track off-set.
Figure 6:
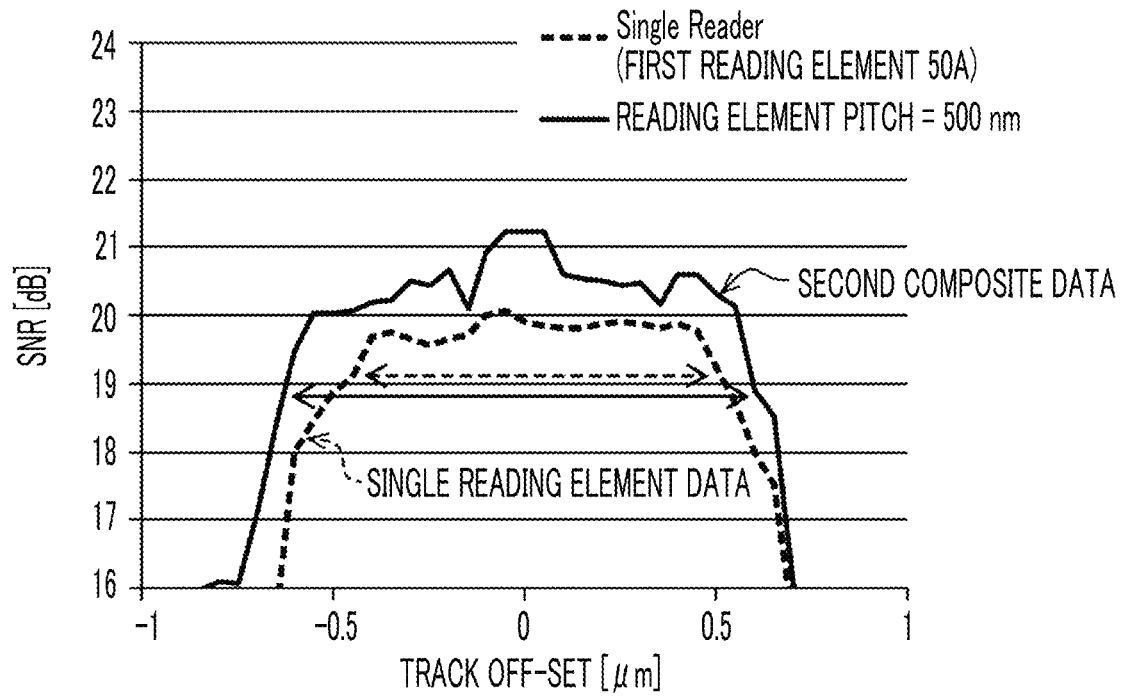
FIG. 6 is a graph showing an example of a correlation between an SNR regarding each of the single reading element data item and a second composite data item under a second condition, and track off-set.

FIGS. 4 to 6 show results obtained from experiments performed by the present inventors. As an example shown in FIG. 4, a reading element pair 50 are disposed on a track region 49. The track region 49 is a first track 49A, a second track 49B, and a third track 49C adjacent to each other in the tape width direction. The reading element pair 50 are a first reading element 50A and a second reading element 50B. The first reading element 50A and the second reading element 50B are disposed at positions adjacent to each other in the tape width direction. The first reading element 50A is disposed so as to face the second track 49B which is the reading target track and fall in the second track 49B. In addition, the second reading element 50B is disposed so as to face the first track 49A adjacent to one side of the second track 49B and fall in the first track 49A.

FIG. 5 shows an example of a correlation between an SNR regarding each of a single reading element data item and a first composite data item under a first condition, and track off-set. In addition, FIG. 6 shows an example of a correlation between an SNR regarding each of the single reading element data item and a second composite data item under a second condition, and track off-set.

Here, the single reading element data indicates data obtained by performing a waveform equalization process with respect to data read by the first reading element 50A, in the same manner as in the case of the first reading element 40 shown in FIG. 3. The first condition indicates a condition in which a reading element pitch is 700 nm (nanometers). The second condition indicates a condition in which a reading element pitch is 500 nm. The reading element pitch indicates a pitch of the first reading element 50A and the second reading element 50B in the tape width direction, as shown in FIG. 4 as an example. The track off-set indicates a deviation amount between the center of the second track 49B in the tape width direction and the center of the first reading element 50A in the track width direction, as an example shown in FIG. 4.

The first composite data indicates data composed by adding a first waveform equalized data item and a second waveform equalized data item obtained under the first condition. The first waveform equalized data item indicates data obtained by performing the waveform equalization process with respect to the data read by the first reading element 50A, in the same manner as in the case of the first reading element 40 shown in FIG. 3. The second waveform equalized data item indicates data obtained by performing the waveform equalization process with respect to the data read by the second reading element 50B, in the same manner as in the case of the second reading element 42 shown in FIG. 3. The second composite data indicates data composed by adding a first waveform equalized data item and a second waveform equalized data item obtained under the second condition.

In a case of comparing the SNR of the first composite data shown in FIG. 5 to the SNR of the second composite data shown in FIG. 6, the SNR of the first composite data rapidly declines to generate a groove of the graph, in a case where the track off-set is −0.4 µm (micrometers) to 0.2 µm, whereas the SNR of the second composite data does not rapidly decline as the graph of the SNR of the first composite data. Each of the SNR of the first composite data and the SNR of the second composite data is higher than the SNR of the single reading element data, and particularly, the SNR of the second composite data is higher than the SNR of the single reading element data over the entire range of the track off-set.

From the experimental results shown in FIGS. 5 and 6, the present inventors have found that it is preferable to perform the reading of data in a state where the first reading element 50A and the second reading element 50B are adjacent to each other in the tape width direction, compared to a case where the reading of data is performed by only the first reading element 50A. The "state adjacent to each other" here means that the first reading element 50A and the second reading element 50B are not in contact with each other, but are disposed in a line in the tape width direction, so that the SNR becomes higher than the SNR of the single reading element data, over the entire range of the track off-set.

In one aspect, as an example shown in FIG. 3, in the reading element unit 38, parts of the first reading element 40 and the second reading element 42 are overlapped each other in the running direction, and accordingly, a high density of the tracks included in the magnetic tape MT is realized.

As shown in FIG. 7 as an example, the magnetic tape apparatus 10 comprises an actuator 60, an extraction unit 62, an analog/digital (A/D) converters 64, 66, and 68, a decoding unit 69, and a computer 73.

The control device 18 is connected to the servo element pair 36 through the analog-to-digital (A/D) converter 68. The A/D converter 68 outputs a servo signal obtained by converting an analog signal obtained by reading the servo pattern 32 by the servo elements 36A and 36B included in the servo element pairs 36 into a digital signal, to the control device 18.

The control device 18 is connected to the actuator 60. The actuator 60 is attached to the reading head 16 and applies electric power to the reading head 16 under the control of the control device 18, to change the position of the reading head 16 in the tape width direction. The actuator 60, for example, includes a voice coil motor, and the electric power applied to the reading head 16 is electric power obtained by converting an electric energy based on a current flowing through the coil into a kinetic energy, using an energy of a magnet as a medium.

Here, the aspect in which the voice coil motor is loaded on the actuator 60 has been described. However, the magnetic tape apparatus is not limited to the aspect, and for example, a piezoelectric element can also be used, instead of the voice coil motor. In addition, the voice coil motor and the piezoelectric element can be combined with each other.

The deviation amount of the positions of the magnetic tape MT and the reading element unit 38 is determined in accordance with a servo signal which is a result obtained by reading the servo patterns 32 by the servo element pair 36. The control device 18 controls the actuator 60 to apply the electric power according to the deviation amount of the positions of the magnetic tape MT and the reading element unit 38 to the reading head 16. Accordingly, the position of the reading head 16 is changed in the tape width direction and the position of the reading head 16 is adjusted to a normal position. Here, for example shown in FIG. 3, the normal position indicates a position of the reading head 16 in a default state of the magnetic tape apparatus 10.

Here, the aspect in which the deviation amount of the positions of the magnetic tape MT and the reading element unit 38 is determined in accordance with the servo signal which is the result obtained by reading of the servo pattern 32 by the servo element pair 36 is used as an example. However, the magnetic tape apparatus is not limited to the aspect. For example, as the deviation amount of the positions of the magnetic tape MT and the reading element unit 38, the deviation amount of predetermined reference positions of the servo element 36A and the magnetic tape MT may be used, or the deviation amount of an end surface of the reading head 16 and a center position of a specific track included in the magnetic tape MT may be used. As described above, the deviation amount of the positions of the magnetic tape MT and the reading element unit 38 may be the deviation amount corresponding to the deviation amount between the center of the reading target track 30A in the tape width direction and the center of the reading head 16 in the tape width direction. Hereinafter, for convenience of description, the deviation amount of the positions of the magnetic tape MT and the reading element unit 38 is simply referred to as a "deviation amount".

For example shown in FIG. 8, the deviation amount is calculated based on a ratio of a distance A to a distance B. The distance A indicates a distance calculated from a result obtained by reading the first diagonal line 32A and the second diagonal line 32B adjacent to each other by the servo element 36A. The distance B indicates a distance calculated from a result obtained by reading the two first diagonal lines 32A adjacent to each other by the servo element 36A.

The extraction unit 62 comprises the control device 18 and a two-dimensional FIR filter 71. The two-dimensional FIR filter 71 comprises the adder 44, the first equalizer 70, and the second equalizer 72.

The first equalizer 70 is connected to the first reading element 40 through the A/D converter 64. In addition, the first equalizer 70 is connected to each of the control device 18 and the adder 44. The data read by the first reading element 40 from the specific track region 31 is an analog signal, and the A/D converter 64 outputs a first reading signal obtained by converting the data read by the first reading element 40 from the specific track region 31 into a digital signal, to the first equalizer 70.

The second equalizer 72 is connected to the second reading element 42 through the A/D converter 66. In addition, the second equalizer 72 is connected to each of the control device 18 and the adder 44. The data read by the second reading element 42 from the specific track region 31 is an analog signal, and the A/D converter 66 outputs a second reading signal obtained by converting the data read by the second reading element 42 from the specific track region 31 into a digital signal, to the second equalizer 72. The first reading signal and the second reading signal are one example of a "reading result for each reading element".

The first equalizer 70 performs the waveform equalization process with respect to the input first reading signal. For example, the first equalizer 70 performs a convolution arithmetic operation of a tap coefficient with respect to the input first reading signal, and outputs the first arithmetic operation processed signal which is a signal after the arithmetic operation.

The second equalizer 72 performs the waveform equalization process with respect to the input second reading signal. For example, the second equalizer 72 performs a convolution arithmetic operation of a tap coefficient with respect to the input second reading signal, and outputs the second arithmetic operation processed signal which is a signal after the arithmetic operation.

Each of the first equalizer 70 and the second equalizer 72 outputs the first arithmetic operation processed signal and the second arithmetic operation processed signal to the adder 44. The adder 44 adds and composes the first arithmetic operation processed signal input from the first equalizer 70 and the second arithmetic operation processed signal input from the second equalizer 72, and outputs the composite data obtained by the composite to the decoding unit 69.

Each of the first equalizer 70 and the second equalizer 72 is a one-dimensional FIR filter.

In one aspect, the FIR filter is a series of actual values including positive and negative values, the number of lines of the series is referred to as a tap number, and the numerical value is referred to as a tap coefficient. In addition, in one aspect, the waveform equalization indicates a process of the convolution arithmetic operation of the series of actual values, that is, the tap coefficient, with respect to the reading signal. The "reading signal" here indicates a collective term of the first reading signal and the second reading signal. In one aspect, the equalizer indicates a circuit which carries out a process of performing the convolution arithmetic operation of the tap coefficient with respect to the reading signal or the other input signal and outputting the signal after the arithmetic operation. In addition, in one aspect, the adder indicates a circuit which simply adds two series. The weighting of the two series is reflected on the numerical values, that is, the tap coefficient of the FIR filter used in the first equalizer 70 and the second equalizer 72.

The control device 18 performs the waveform equalization process according to the deviation amount with respect to each of the first equalizer 70 and the second equalizer 72 by setting the tap coefficient according to the deviation amount with respect to the FIR filter of each of the first equalizer 70 and the second equalizer 72.

The control device 18 comprises an association table 18A. The association table 18A associates the tap coefficient with the deviation amount regarding each of the first equalizer 70 and the second equalizer 72. A combination of the tap coefficient and the deviation amount is, for example, a combination obtained in advance as a combination of the tap coefficient and the deviation amount, with which the best composite data is obtained by the adder 44, based on the result obtained by performing at least one of the test performed with a real machine or a simulation. The "best composite data" here indicates data corresponding to the reading target track data.

Here, the "reading target track data" indicates "data derived from the reading target track 30A". The "data derived from the reading target track 30A" indicates data corresponding to data written on the reading target track 30A. As an example of the data written on the reading target track 30A, data which is read from the reading target track 30A and to which a noise component from the adjacent tracks is not mixed is used.

As described above, the association table 18A is used as an example. In another aspect, an arithmetic expression may be used instead of the association table 18A. The "arithmetic expression" here indicates an arithmetic expression in which an independent variable is set as the deviation amount and a dependent variable is set as the tap coefficient, for example.

As described above, the aspect in which the tap coefficient is derived from the association table 18A, in which combinations of the tap coefficients and the deviation amounts are regulated, has been described. In another aspect, for example, the tap coefficient may be derived from the association table in which the combinations of tap coefficients and ratios are regulated, or the arithmetic expression. The "ratio" here indicates a ratio between an overlapping region with the reading target track 30A and an overlapping region with the adjacent track, regarding each of the first reading element 40 and the second reading element 42. The ratio is calculated and specified from the deviation amount by the control device 18 and the tap coefficient is determined in accordance with the specified ratio.

The decoding unit 69 decodes the composite data input from the adder 44 and outputs a decoded signal obtained by the decoding to the computer 73. The computer 73 performs various processes with respect to the decoded signal input from the decoding unit 69.

Next, a magnetic tape reading process carried out by the extraction unit 62 will be described with reference to FIG. 9. Hereinafter, for convenience of description, the embodiment is described based on assumption that the servo signal is input to the control device 18, in a case where a period of the sampling comes. Here, the sampling is not limited to the sampling of the servo signal and also means the sampling of the reading signal. That is, in one aspect, the track region 30 is formed in parallel with the servo pattern 32 along the running direction, and accordingly, the reading operation by the reading element unit 38 is performed synchronously with the reading operation by the servo element pair 36.

Figure 9:
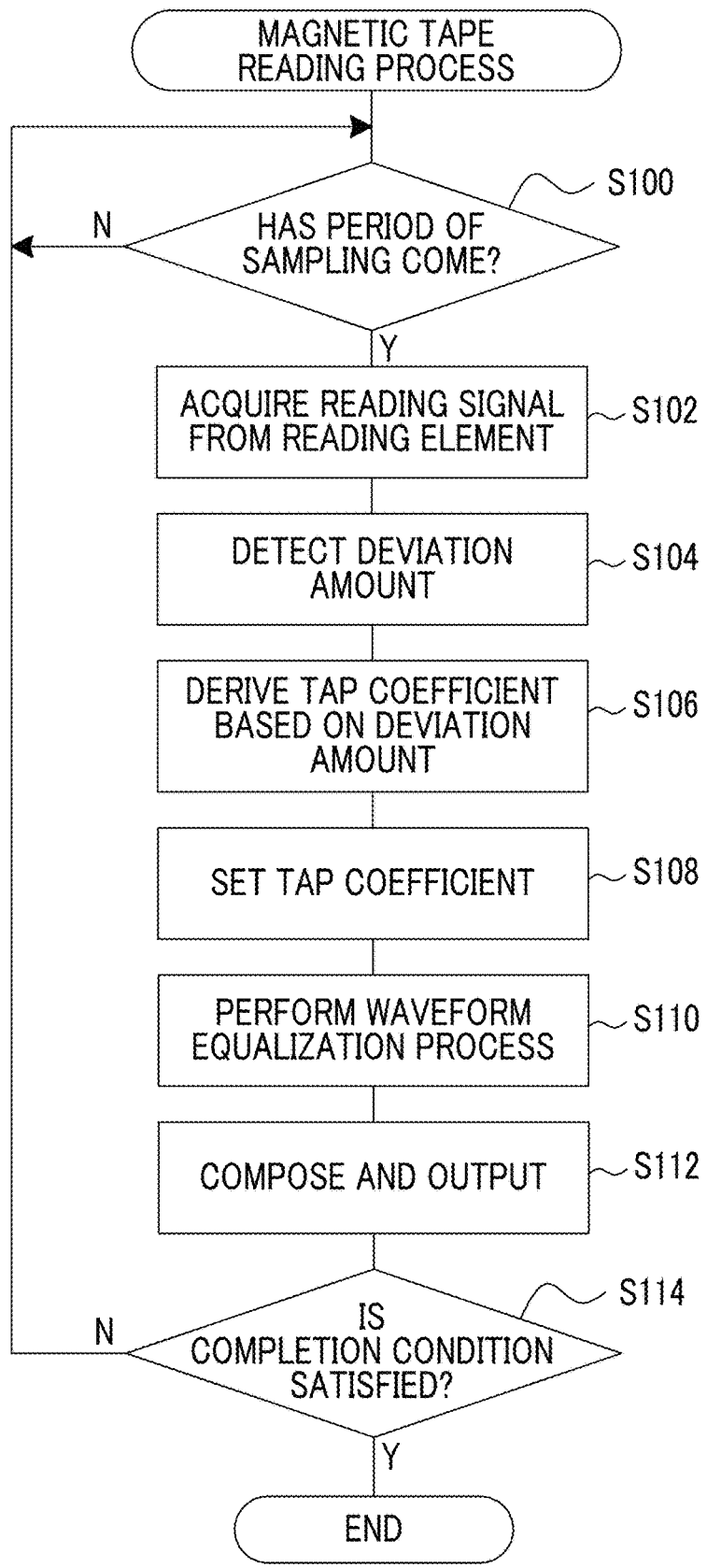
FIG. 9 is a flowchart showing an example of a flow of a magnetic tape reading process.

In the process shown in FIG. 9, first, in a step S100, the control device 18 determines whether or not the period of the sampling comes. In the step S100, in a case where the period of the sampling comes, the determination is affirmative and the magnetic tape reading process moves to a step S102. In the step S100, in a case where the period of the sampling does not come, the determination is denied, and the determination of the step S100 is performed again.

In a step S102, the first equalizer 70 acquires a first reading signal, the second equalizer 72 acquires a second reading signal, and then, the magnetic tape reading process moves to a step S104.

In the step S104, the control device 18 acquires a servo signal and calculates a deviation amount from the acquired servo signal, and then the magnetic tape reading process moves to a step S106.

In the step S106, the control device 18 derives a tap coefficient corresponding to the deviation amount calculated in the process of the step S104 from the association table 18A, regarding first to third taps of each of the first equalizer 70 and the second equalizer 72. That is, by performing the process of the step S106, an optimal combination is determined as a combination of a one-dimensional FIR filter which is an example of the first equalizer 70 and a one-dimensional filter which is an example of the second equalizer 72. The "optimal combination" here indicates, for example, a combination in which the composite data output by performing a process of a step S112 which will be described later is set as data corresponding to the reading target track data.

In the next step S108, the control device 18 sets the tap coefficient derived in the process of the step S106 with respect to each of the first equalizer 70 and the second equalizer 72, and then the magnetic tape reading process moves to a step S110.

In the step S110, the first equalizer 70 performs the waveform equalization process with respect to the first reading signal acquired in the process of the step S102, and accordingly, the first arithmetic operation processed signal is generated. The first equalizer 70 outputs the generated first arithmetic operation processed signal to the adder 44. The second equalizer 72 performs the waveform equalization process with respect to the second reading signal acquired in the process of the step S102, and accordingly, the second arithmetic operation processed signal is generated. The second equalizer 72 outputs the generated second arithmetic operation processed signal to the adder 44.

Figure 10:
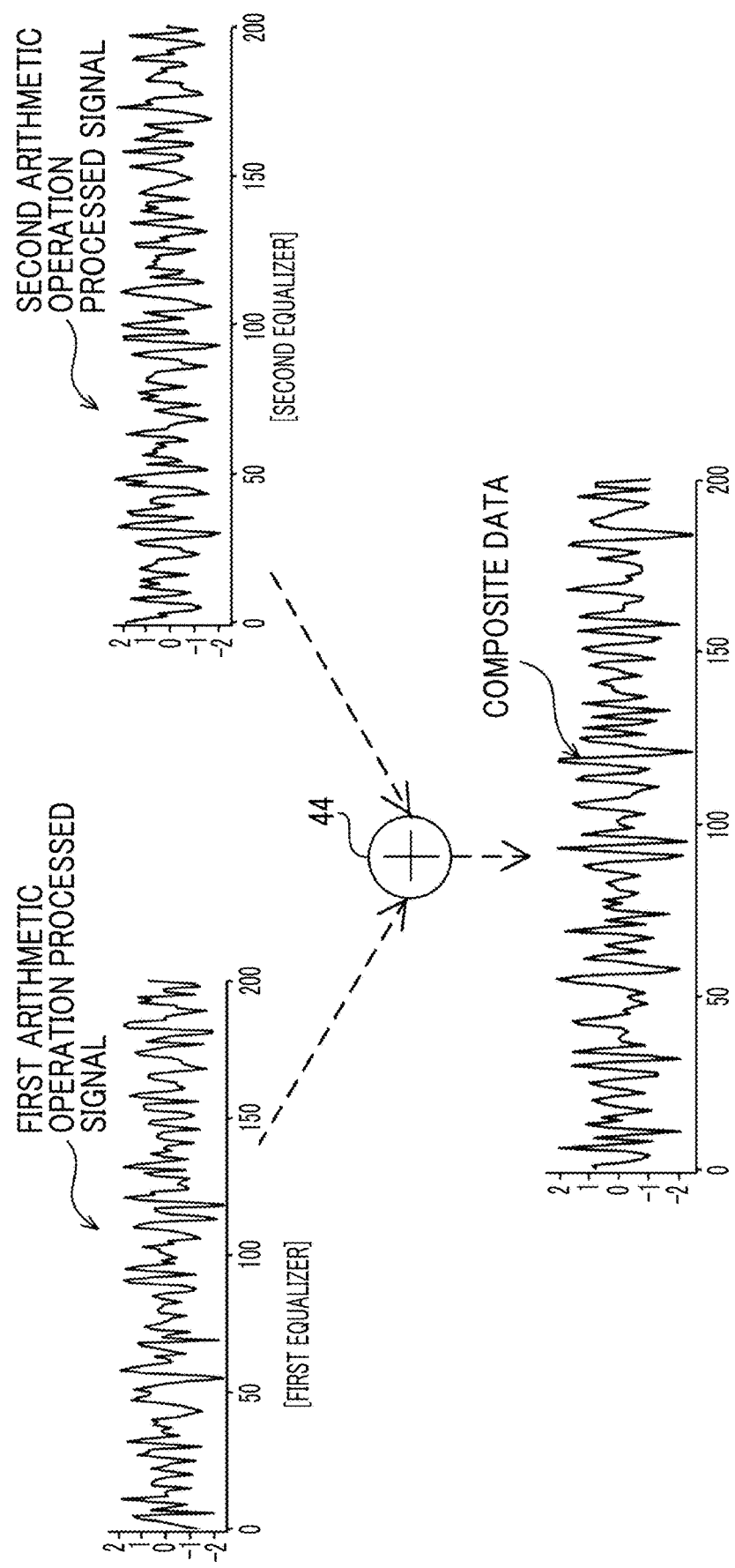
FIG. 10 is a conceptual view provided for description of a process performed by a two-dimensional FIR filter of an extraction unit.

In the next step S112, the adder 44 adds and composes the first arithmetic operation processed signal input from the first equalizer 70 and the second arithmetic operation processed signal input from the second equalizer 72, as shown in FIG. 10 as an example. The adder 44 outputs the composite data obtained by the composite to the decoding unit 69.

In a case where the reading element unit 38 is disposed in the specific track region 31, as the example shown in FIG. 3, the data corresponding to the reading target track data, from which the noise component from the first noise mixing source track 30B is removed, is output as the composite data, by performing the process of the step S112. That is, by performing the process of the step S102 to the step S112, the extraction unit 62 extracts only the data derived from the reading target track 30A.

Figure 11:
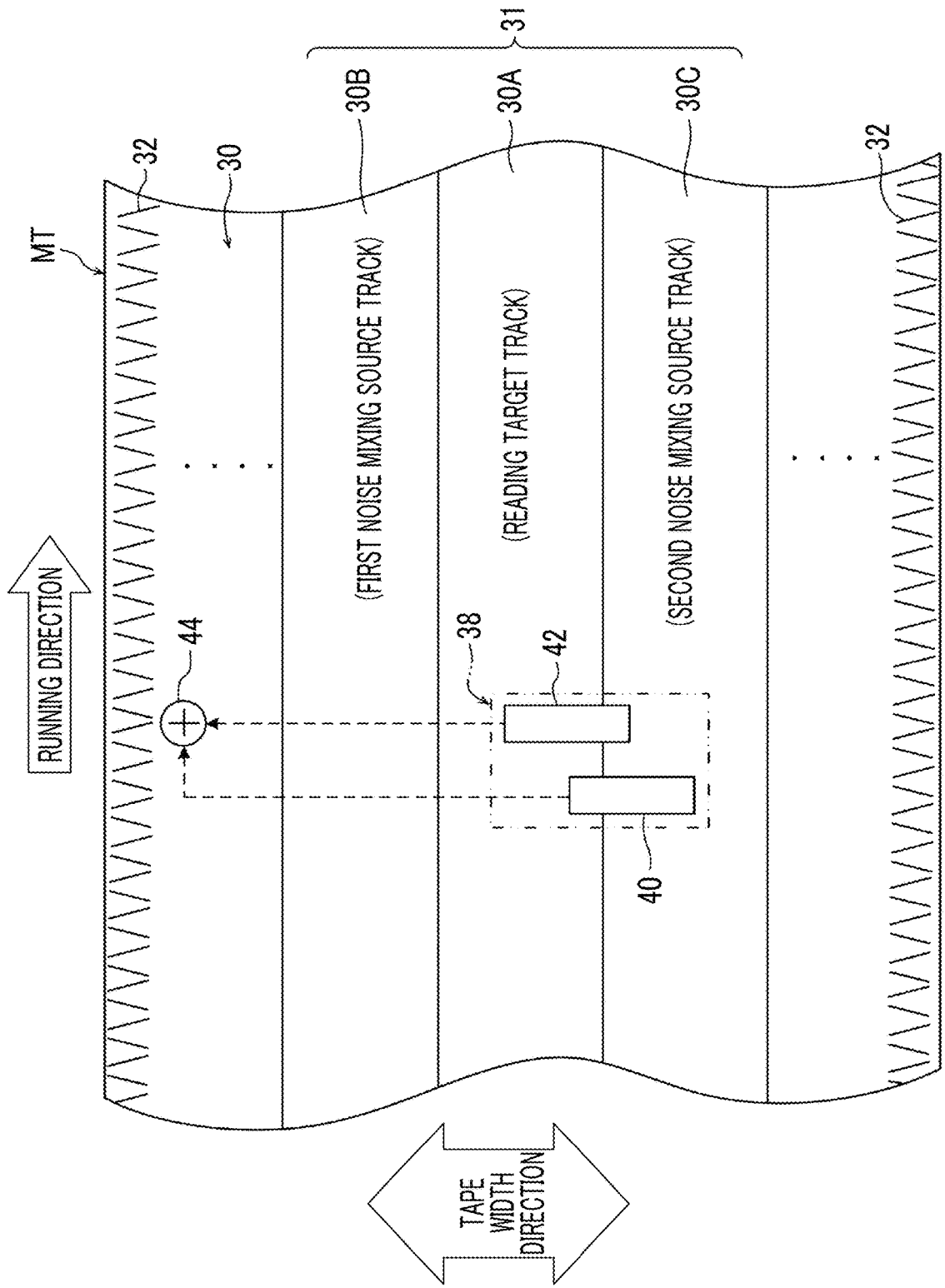
FIG. 11 is a schematic plan view showing an example of a state where the reading element unit straddles over a reading target track and a second noise mixing source track.

In a case where the magnetic tape MT expands and contracts in the tape width direction or vibration is applied to at least one of the magnetic tape MT or the reading head 16, the reading element unit 38 is displaced to a position shown in FIG. 11 from the position shown in FIG. 3 as an example. In the example shown in FIG. 11, the first reading element 40 and the second reading element 42 are disposed at positions straddling over both of the reading target track 30A and the second noise mixing source track 30C. In this case, by performing the process of the step S102 to the step S112, the data corresponding to the reading target track data, from which the noise component from the second noise mixing source track 30C is removed, is output to the decoding unit 69 as the composite data.

In the next step S114, the control device 18 determines whether or not a condition for completing the magnetic tape reading process (hereinafter, referred to as a "completion condition") is satisfied. The completion condition indicates, for example a condition in which the entire magnetic tape MT is wound around the winding reel 22, a condition in which an instruction for forced completion of the magnetic tape reading process is applied from the outside, and the like.

In the step S114, in a case where the completion condition is not satisfied, the determination is denied, and the magnetic tape reading process is moved to the step S100. In the step S114, in a case where the completion condition is satisfied, the determination is affirmative, and the magnetic tape reading process ends.

As described above, in one aspect of the magnetic tape apparatus 10, the data from the specific track region 31 is read by each of the first reading element 40 and the second reading element 42 disposed in a state of being adjacent to each other. In addition, the extraction unit 62 performs the waveform equalization process according to the deviation amount with respect to each of the first reading element 40 and the second reading element 42, to extract the data derived from the reading target track 30A from the first reading signal and the second reading signal. Therefore, in the magnetic tape apparatus 10, it is possible to prevent a deterioration in reproducing quality of data read from the reading target track 30A by the linear scanning method, compared to a case where the data is read from the reading target track 30A only by a single reading element by the linear scanning method.

In one aspect of the magnetic tape apparatus 10, parts of the first reading element 40 and the second reading element 42 are overlapped each other in the running direction. Therefore, in the magnetic tape apparatus 10, it is possible to increase reproducing quality of data read from the reading target track 30A by the linear scanning method, compared to a case where the entire portions of the plurality of reading elements are overlapped in the running direction.

In one aspect of the magnetic tape apparatus 10, the specific track region 31 is the reading target track 30A, the first noise mixing source track 30B, and the second noise mixing source track 30C, and each of the first reading element 40 and the second reading element 42 straddles over both of the reading target track 30A and the adjacent track, in a case where a positional relationship with the magnetic tape MT is changed. Therefore, in the magnetic tape apparatus 10, it is possible to reduce the noise component generated in one of the reading element of the first reading element 40 and the second reading element 42 due to entering the adjacent track from the reading target track 30A in the tape width direction, by using the reading result obtained by the other reading element entering the adjacent track from the reading target track 30A in the tape width direction, compared to a case where the data is read by only the single reading element from the reading target track 30A by the linear scanning method.

In one aspect of the magnetic tape apparatus 10, the tap coefficient used in the waveform equalization process is determined in accordance with the deviation amount. Therefore, in the magnetic tape apparatus 10, it is possible to instantaneously reduce the noise component generated due to the entering the reading target track 30A from the adjacent track in the tape width direction, in accordance with a change of the positional relationship between the magnetic tape MT and the reading element unit 38, compared to a case where the tap coefficient is determined in accordance with a parameter with no relation with the deviation amount.

In one aspect of the magnetic tape apparatus 10, regarding each of the first reading element 40 and the second reading element 42, the ratio between the overlapping region with the reading target track 30A and the overlapping region with the adjacent track is specified from the deviation amount, and the tap coefficient according to the specified ratio is determined. Therefore, in the magnetic tape apparatus 10, it is possible to exactly reduce the noise component, even in a case where the positional relationship between the magnetic tape MT and the reading element unit 38 is changed, compared to a case where the tap coefficient is determined in accordance with a parameter with no relation with a ratio between the overlapping region with the reading target track 30A and the overlapping region with the adjacent track regarding each of the plurality of reading elements.

In one aspect of the magnetic tape apparatus 10, the deviation amount is determined in accordance with the result obtained by reading the servo patterns 32 by the servo element pair 36. Therefore, in the magnetic tape apparatus 10, it is possible to easily determine the deviation amount, compared to a case where the servo patterns 32 are not applied to the magnetic tape MT.

In one aspect of the magnetic tape apparatus 10, the reading operation by the reading element unit 38 is performed synchronously with the reading operation by the servo element pair 36. Therefore, in the magnetic tape apparatus 10, it is possible to instantaneously reduce the noise component generated due to the entering the reading target track from the adjacent track in the width direction of the magnetic tape, compared to a case of a magnetic disk and a magnetic tape in a helical scanning method, in which a servo pattern and data cannot be synchronously read.

In one aspect of the magnetic tape apparatus 10, the extraction unit 62 includes the two-dimensional FIR filter 71. Each result obtained by performing the waveform equalization process with respect to each of the first reading signal and the second reading signal is composed by the two-dimensional FIR filter 71, and accordingly, the data derived from the reading target track 30A is extracted from the first reading signal and the second reading signal. Therefore, in the magnetic tape apparatus 10, it is possible to rapidly extract the data derived from the reading target track 30A from the first reading signal and the second reading signal, compared to a case of using only a one-dimensional FIR filter. In addition, in the magnetic tape apparatus 10, it is possible to realize simple calculation due to a smaller operation amount, compared to a case of performing a matrix operation.

In one aspect of the magnetic tape apparatus 10, the first reading element 40 and the second reading element 42 are used as a pair of reading elements. Therefore, in the magnetic tape apparatus 10, it is possible to contribute to miniaturization of the reading element unit 38, compared to a case of using three or more reading elements. By miniaturizing the reading element unit 38, the reading unit 26 and the reading head 16 can also be miniaturized. In addition, in the magnetic tape apparatus 10, it is possible to prevent occurrence of a situation in which the reading element units 38 adjacent to each other are in contact with each other.

In one aspect of the magnetic tape apparatus 10, each of the plurality of reading element units 38 reads data from the corresponding reading target track 30A included in each of the plurality of specific track regions 31 by the linear scanning method. Therefore, in the magnetic tape apparatus 10, it is possible to rapidly complete the reading of data from the plurality of reading target tracks 30A, compared to a case where the data is read by only the single reading element unit 38 from each of the plurality of reading target tracks 30A.

In the aspect, in a default state of the magnetic tape apparatus 10, each of the first reading element 40 and the second reading element 42 is provided to straddle over both of the reading target track 30A and the first noise mixing source track 30B, but the magnetic tape apparatus is not limited to the aspect. In an example shown in FIG. 12, a reading element unit 138 is used instead of the reading element unit 38 described above. The reading element unit 138 comprises a first reading element 140 and a second reading element 142. In a default state of the magnetic tape apparatus 10, the center of the first reading element 140 in the tape width direction coincides with a center CL of the reading target track 30A in the tape width direction. In a default state of the magnetic tape apparatus 10, the first reading element 140 and the second reading element 142 fall in the reading target track 30A, without being protruded to the first noise mixing source track 30B and the second noise mixing source track 30C. In addition, in a default state of the magnetic tape apparatus 10, parts of the first reading element 140 and the second reading element 142 are provided to be overlapped each other in the running direction, in the same manner as the case of the first reading element 40 and the second reading element 42 described in the embodiment.

Figure 12:
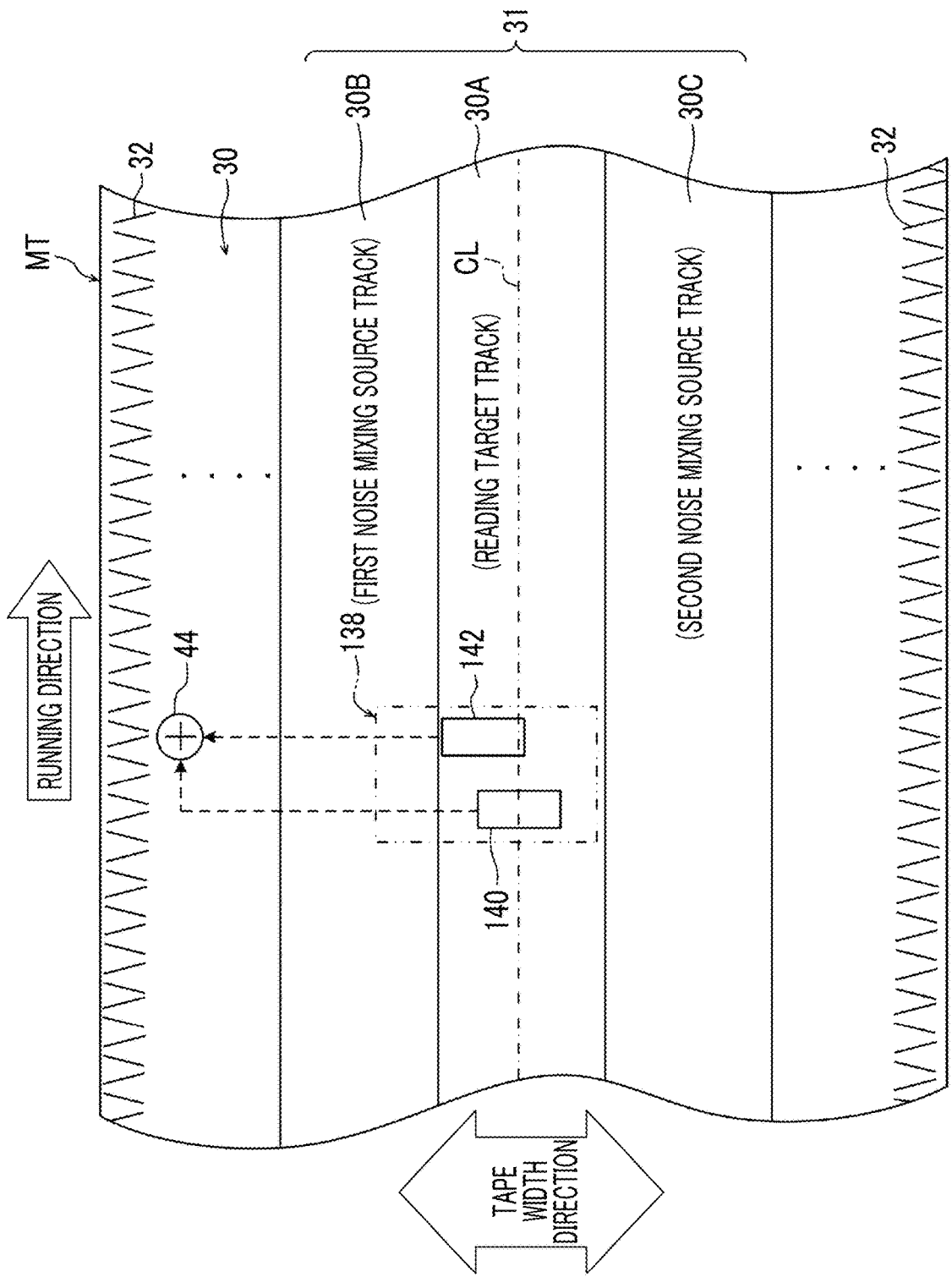
FIG. 12 is a schematic plan view showing a first modification example of the reading element unit.

As shown in FIG. 12 as an example, even in a state where the first reading element 140 and the second reading element 142 face the reading target track 30A, without being protruded from the reading target track 30A, a positional relationship between the reading element unit 138 and the magnetic tape MT may be changed. That is, the reading element unit 138 may straddle over the reading target track 30A and the first noise mixing source track 30B, or the reading element unit 138 may straddle over the reading target track 30A and the second noise mixing source track 30C. Even in these cases, by performing the processes in the step S102 to the step S112 described above, it is possible to obtain the data corresponding to the reading target track data, from which the noise component from the first noise mixing source track 30B or the second noise mixing source track 30C is removed.

In addition, parts of the first reading element 140 and the second reading element 142 are disposed at position to be overlapped each other in the running direction, and accordingly, the second reading element 142 can read the data from a portion of the reading target track 30A where the reading cannot be performed by the first reading element 140. As a result, it is possible to increase reliability of the reading target track data, compared to a case where the first reading element 140 singly reads the data from the reading target track 30A.

As shown in FIG. 11 as an example, in a default state of the magnetic tape apparatus 10, each of the first reading element 40 and the second reading element 42 may be disposed at a position to straddle over both of the reading target track 30A and the second noise mixing source track 30C.

As described above, the reading element unit 38 including the first reading element 40 and the second reading element 42 has been described. However, the magnetic tape apparatus is not limited to the aspect. In an example shown in FIG. 13, a reading element unit 238 may be used instead of the reading element unit 38. The reading element unit 238 is different from the reading element unit 38, in a point that a third reading element 244 is included. In a default state of the magnetic tape apparatus 10, the third reading element 244 is disposed at a position where a part thereof is overlapped with a part of the first reading element 40 in the running direction. In addition, in a default state of the magnetic tape apparatus 10, the third reading element 244 is disposed at a position to straddle over the reading target track 30A and the second noise mixing source track 30C.

In this case, a third equalizer (not shown) is also allocated to the third reading element 244, in the same manner as a case where the first equalizer 70 is allocated to the first reading element 40 and the second equalizer 72 is allocated to the second reading element 42. The third equalizer also has the same function as that of the first equalizer and the second equalizer described above, and performs a waveform equalization process with respect to a third reading signal obtained by reading performed by the third reading element 244. The third equalizer performs a convolution arithmetic operation of a tap coefficient with respect to the third reading signal and outputs the third arithmetic operation processed signal which is a signal after the arithmetic operation. The adder 44 adds and composes a first arithmetic operation processed signal corresponding to the first reading signal, a second arithmetic operation processed signal corresponding to the second reading signal, the third arithmetic operation processed signal corresponding to the third reading signal, and outputs the composite data obtained by the composite to the decoding unit 69.

Figure 13:
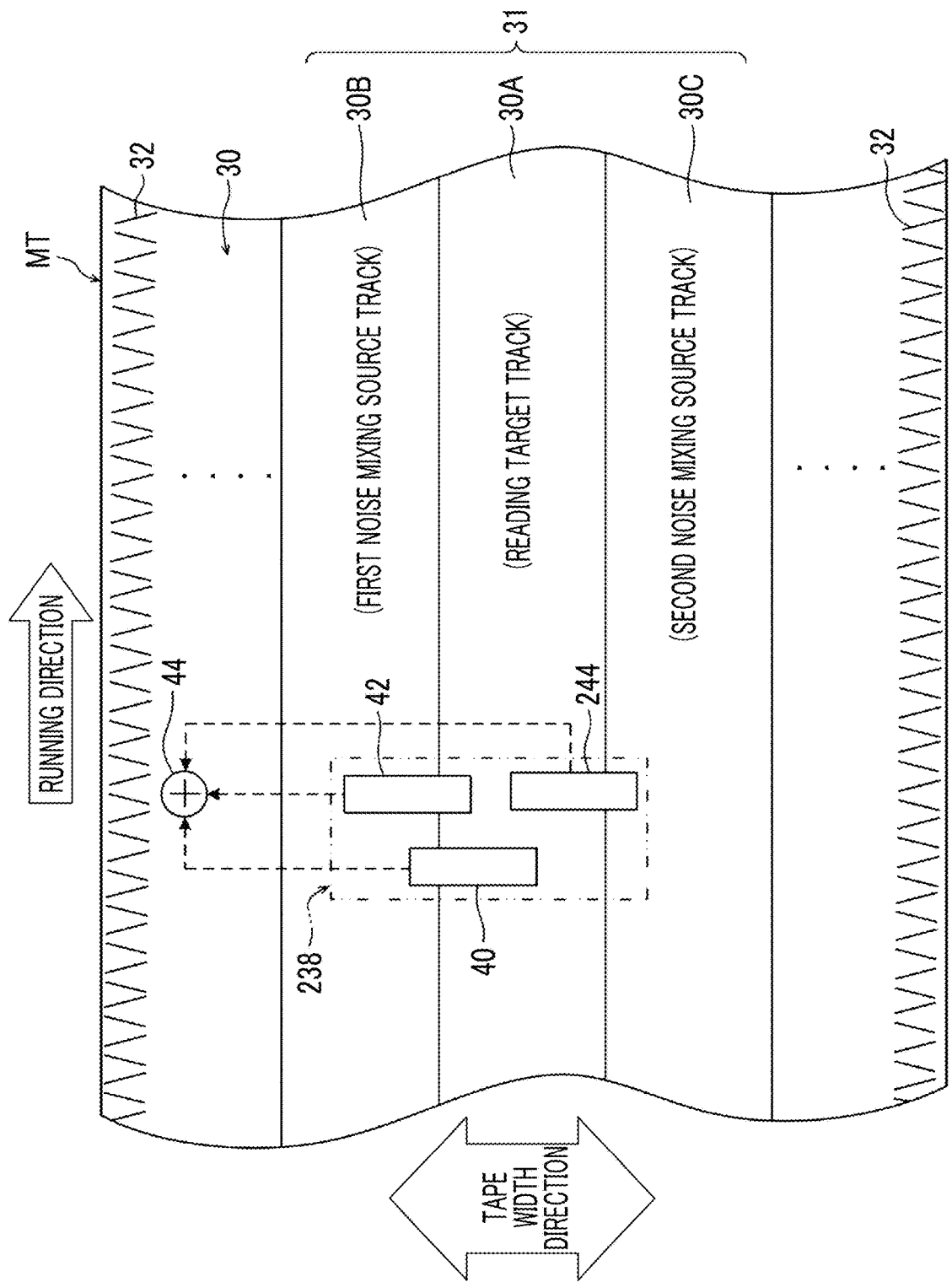
FIG. 13 is a schematic plan view showing a second modification example of the reading element unit.

In the example shown in FIG. 13, in a default state of the magnetic tape apparatus 10, the third reading element 244 is disposed at the position straddling over the reading target track 30A and the second noise mixing source track 30C, but the technology of the present disclosure is not limited thereto. In a default state of the magnetic tape apparatus 10, the third reading element 244 may be disposed at the position facing the reading target track 30A, without being protruded from the reading target track 30A.

As described above, the reading element unit 38 has been described. However, the magnetic tape apparatus is not limited to the aspect. For example, the reading element pair 50 shown in FIG. 4 may be used instead of the reading element unit 38. In this case, the first reading element 50A and the second reading element 50B are set to be disposed at positions adjacent to each other in the tape width direction. In addition, the first reading element 50A and the second reading element 50B are set to be disposed in a line in the tape width direction so that the SNR is higher than the SNR of the single reading element data over the entire range of the track off-set, as shown in FIG. 6 as an example, without being in contact with each other.

In the example shown in FIG. 4, for example, the first reading element 50A falls in the second track 49B in a plan view, and the second reading element 50B falls in the first track 49A in a plan view.

As described above, the servo element pair 36 have been described. However, the magnetic tape apparatus is not limited to the aspect. For example, one of the servo elements 36A and 36B may be used instead of the servo element pair 36.

As described above, the aspect in which the plurality of specific track regions 31 are arranged in the track region 30 at regular interval in the tape width direction has been described. However, the magnetic tape apparatus is not limited to the aspect. For example, in two specific track regions 31 adjacent to each other in the plurality of specific track regions 31, one specific track region 31 and the other specific track region 31 may be arranged in the tape width direction so as to be overlapped by the area of one track in the tape width direction. In this case, one adjacent track included in one specific track region 31 (for example, first noise mixing source track 30B) becomes the reading target track 30A in the other specific track region 31. In addition, the reading target track 30A included in one specific track region 31 becomes the adjacent track region (for example, second noise mixing source track 30C) in the other specific track region 31.

The configuration of the magnetic tape apparatus and the magnetic tape reading process described above are merely an example. Accordingly, unnecessary steps can be removed, new steps can be added, and the process procedure can be changed, within a range not departing from the gist.

The magnetic tape apparatus can perform the reading (reproducing) of data recorded on the magnetic tape, and can also have a configuration for recording data on the magnetic tape.

Magnetic Tape

Next, the magnetic tape on which the reading of the data is performed in the magnetic tape apparatus will be described in detail.

Base Friction

A coefficient of friction measured regarding the base portion of the surface of the magnetic layer of the magnetic tape (base friction) is equal to or smaller than 0.35.

In the invention and the specification, the "surface of the magnetic layer" is identical to the surface of the magnetic tape on the magnetic layer side, and the "base portion" is a portion of the surface of the magnetic layer of the magnetic tape specified by the following method.

A surface on which volume of a protruded component and volume of a recess component in a visual field measured by an atomic force microscope (AFM) are identical to each other is determined as a reference surface. A projection having a height equal to or greater than 15 nm from the reference surface is defined as a projection. A portion in which the number of such projections is zero, that is, a portion of the surface of the magnetic layer of the magnetic tape in which a projection having a height equal to or greater than 15 nm from the reference surface is not detected is specified as the base portion.

A coefficient of friction measured regarding the base portion is a value measured by the following method.

In the base portion (measured part: length of a magnetic tape in a longitudinal direction of 10 µm), a diamond spherical indenter having a radius of 1 µm is allowed to reciprocate once with a load of 100 µN and a speed of 1 µm/sec to measure a frictional force (horizontal force) and a normal force. The frictional force and the normal force measured here are an arithmetical mean of respective values obtained by continuously measuring frictional forces and normal forces during the one reciprocating operation. The measurement described above can be performed with TI-950 type TRIBOINDENTER manufactured by Hysitron, Inc. A value of a coefficient of friction µ is calculated from an arithmetical mean of the frictional forces and an arithmetical mean of the normal forces measured as described above. The coefficient of friction is a value measured by an equation of $F=\mu N$, from the frictional force (horizontal force) F (unit: newton (N)) and the normal force N (unit: newton (N)). The measurement and the calculation of the value of the coefficient of friction µ are performed at three portions of the base portion randomly selected from the surface of the magnetic layer of the magnetic tape, and an arithmetical mean of the three measured values obtained is set as a coefficient of friction measured regarding the base portion (base friction).

In recent years, a technology of including a non-magnetic powder such as an abrasive in the magnetic layer of the magnetic tape is widely performed. Such a non-magnetic powder is generally protruded from the surface of the magnetic layer to form projections, and thereby exhibiting various functions. In general, the coefficient of friction measured regarding the magnetic tape is a coefficient of friction measured in a region including such projections. With respect to this, the base friction is measured in a portion of the surface of the magnetic layer of the magnetic tape in which a projection having a height equal to or greater than 15 nm from the reference surface is not detected, that is, the base portion, as described above. It is considered that the base portion has a low frequency of a contact with the reading element in a case where the surface of the magnetic layer and the reading element slide on each other, while reading the data. However, it is thought that, a high coefficient of friction of the base portion which is in contact with the reading element, even in a case of a low frequency, disturbs smooth sliding between the base portion and the reading element. It is surmised that unsmooth sliding between the base portion and the reading element causes a deterioration in sliding properties between the surface of the magnetic layer and the reading element. With respect to this, it is thought that the base friction in the magnetic tape equal to or smaller than 0.35 contributes to the smooth sliding between the base portion and the reading element, thereby contributing to prevention of the positional change on a small cycle described above. It is surmised that this contributes to setting more suitable waveform equalization process to be performed with respect to the reading result obtained by the reading at each portion.

However, the above surmises do not limit the invention.

The base coefficient of the magnetic tape is preferably equal to or smaller than 0.33, more preferably equal to or smaller than 0.30, even more preferably equal to or smaller than 0.28, and still preferably equal to or smaller than 0.26, from a viewpoint of further improving sliding properties between the base portion and the reading element. The base friction can be, for example, equal to or greater than 0.10 or equal to or greater than 0.15. However, from a viewpoint of improving sliding properties between the base portion and the reading element, a low base friction is preferable, and thus, the base friction may be smaller than the values described above.

In the measurement method of the base friction described above, the reason why a projection having a height equal to or greater than 15 nm from the reference surface is defined as a projection is because, normally, a projection recognized as a projection present on the surface of the magnetic layer is mainly a projection having a height equal to or greater than 15 nm from the reference surface. Such a projection is, for example, formed of non-magnetic powder such as an abrasive on the surface of the magnetic layer. With respect to this, it is considered that more microscopic ruggedness than ruggedness formed by such a projection is present on the surface of the magnetic layer. It is surmised that it is possible to adjust the base friction by controlling a shape of the microscopic ruggedness. As means for realizing the adjustment described above, a method of using two or more kinds of ferromagnetic powders having different average particle sizes as the ferromagnetic powder is used. More specifically, it is thought that, the microscopic ruggedness can be formed on the base portion, in a case where the ferromagnetic powder having a greater average particle size becomes a protruded portion, and it is possible to increase a percentage of the protruded portion present on the base portion by increasing a mixing ratio of the ferromagnetic powder having a greater average particle size (or, conversely, to decrease a percentage of protruded portion present on the base portion by decreasing the mixing ratio). Such means will be described later more specifically.

As other means, a method of forming a magnetic layer with other non-magnetic powder having a greater average particle size than that of ferromagnetic powder, in addition to non-magnetic powder such as an abrasive which can form a projection having a height equal to or greater than 15 nm from the reference surface on the surface of the magnetic layer. More specifically, it is thought that, the microscopic ruggedness can be formed on the base portion, in a case where the other non-magnetic powder becomes a protruded portion, and it is possible to increase a percentage of the protruded portion present on the base portion by increasing a mixing ratio of the non-magnetic powder (or, conversely, to decrease a percentage of protruded portion present on the base portion by decreasing the mixing ratio). Such a method will be described later more specifically.

In addition, it is also possible to adjust the base friction by combining the two kinds of methods.

However, the adjustment methods are merely examples, and it is possible to realize a base friction equal to or smaller than 0.35 by any method capable of adjusting the base friction, and such an aspect is also included in the invention.

Hereinafter, the magnetic tape will be described more specifically.

Magnetic Layer

Ferromagnetic Powder

As described above, as a method of adjusting the base friction, a method of forming a magnetic layer with two or more kinds of ferromagnetic powders having different average particle sizes as ferromagnetic powder is used. In this case, it is preferable that the ferromagnetic powder having a smaller average particle size is used as ferromagnetic powder used with the largest proportion, among the two or more kinds of ferromagnetic powder, from a viewpoint of improving recording density of the magnetic tape. From this viewpoint, in a case where two or more kinds of ferromagnetic powders having different average particle sizes are used as the ferromagnetic powder of the magnetic layer, the ferromagnetic powder having an average particle size equal to or smaller than 50 nm is preferably used, and the ferromagnetic powder having an average particle size equal to or smaller than 40 nm is more preferably used, as the ferromagnetic powder used with the largest proportion. On the other hand, from a viewpoint of stability of magnetization, the average particle size of the ferromagnetic powder used with the largest proportion is preferably equal to or greater than 5 nm, more preferably equal to or greater than 10 nm, and even more preferably equal to or greater than 15 nm. In a case of using one kind of ferromagnetic powder without using two or more kinds of ferromagnetic powders having different average particle sizes, the average particle size of the ferromagnetic powder used is preferably in the range described above due to the reasons described above.

With respect to this, it is preferable that other ferromagnetic powder used with the ferromagnetic powder used with the largest proportion has a greater average particle size than that of the ferromagnetic powder used with the largest proportion. This may be because the base friction can be decreased due to the protruded portion formed of the ferromagnetic powder having a great average particle size on the base portion. From this viewpoint, a difference between an average particle size of the ferromagnetic powder used with the largest proportion and an average particle size of the ferromagnetic powder used therewith, acquired as "(latter average particle size)-(former average particle size)" is preferably 10 to 80 nm, more preferably 10 to 50 nm, even more preferably 10 to 40 nm, and still preferably 12 to 35 nm. As the ferromagnetic powder used with the ferromagnetic powder used with the largest proportion, it is also possible to use two or more kinds of ferromagnetic powders having different average particle sizes. In this case, it is preferable that an average particle size of at least one of ferromagnetic powder of the two or more kinds of ferromagnetic powders satisfies the difference described above, it is more preferable that average particle sizes of more kinds of ferromagnetic powders satisfy the difference described above, and it is even more preferable that average particle sizes of all of the ferromagnetic powders satisfy the difference described above, with respect to the average particle size of the ferromagnetic powder used with the largest proportion.

Regarding two or more kinds of ferromagnetic powders having different average particle sizes, from a viewpoint of controlling base friction, a mixing ratio of the ferromagnetic powder used with the largest proportion to the other ferromagnetic powder (in a case of using two or more kinds of ferromagnetic powders having different average particle sizes as other ferromagnetic powder, the total thereof) is preferably 90.0:10.0 (former:latter) to 99.9:0.1 and more preferably 95.0:5.0 to 99.5:0.5 based on mass.

Here, the ferromagnetic powders having different average particle sizes indicate the total or a part of a batch of the ferromagnetic powders having different average particle sizes. In a case where particle size distribution based on the number or volume of the ferromagnetic powder included in the magnetic layer of the magnetic tape formed with the ferromagnetic powder having different average particle sizes as described above is measured by a well-known measurement method such as a dynamic light scattering method or a laser diffraction method, an average particle size or a maximum peak in the vicinity thereof of the ferromagnetic powder used with the largest proportion can be normally confirmed in a particle size distribution curve obtained by the measurement. In addition, an average particle size or a peak in the vicinity thereof of each ferromagnetic powder can be confirmed. Accordingly, in a case where the particle size distribution of the ferromagnetic powder included in the magnetic layer of the magnetic tape formed by using ferromagnetic powder having an average particle size of 5 to 50 nm with the largest proportion, for example, is measured, the maximum peak can be generally confirmed in a range of the particle size of 5 to 50 nm in the particle size distribution curve.

A part of the other ferromagnetic powders described above may be substituted with other non-magnetic powder which will be described later.

In the invention and the specification, the "ferromagnetic powder" means an aggregate of a plurality of ferromagnetic particles. The "aggregate" not only includes an aspect in which particles configuring the aggregate directly come into contact with each other, and also includes an aspect in which a binding agent or an additive is interposed between the particles. The same applies to various powders such as non-magnetic powder in the invention and the specification. In the invention and the specification, unless otherwise noted, average particle sizes of various powders such as the ferromagnetic powder are values measured by the following method using a transmission electron microscope.

The powder is imaged at a magnification ratio of 100,000 with a transmission electron microscope, the image is printed on printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean ferromagnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The activation volume of the hexagonal strontium ferrite powder is preferably 800 to 1,600 $nm^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 $nm^3$ and can also be, for example equal to or greater than 850 $nm^3$. In addition, from a viewpoint of further improving electromagnetic conversion characteristics, the activation volume of the hexagonal strontium ferrite powder is more preferably equal to or smaller than 1,500 $nm^3$, even more preferably equal to or smaller than 1,400 $nm^3$, still preferably equal to or smaller than 1,300 $nm^3$, still more preferably equal to or smaller than 1,200 $nm^3$, and still even more preferably equal to or smaller than 1,100 $nm^3$. The same can be applied to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2\ Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as a "rare earth atom bulk content" or simply as a "bulk content" for rare earth atom) satisfy a ratio of "rare earth atom surface portion content/rare earth atom bulk content >1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content >1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as ferromagnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic tape. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content >1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface portion uneven distribution, σs tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in σs. In one aspect, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a known measurement device capable of measuring magnetic properties such as a vibrating sample magnetometer. Unless stated otherwise, the mass magnetization σs is a value measured at a magnetic field strength of 15 kOe. With regard to the unit of σs, 1 [kOe]=10$^6$/4π[A/m]

With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, ε-iron oxide powder can also be used. In the invention and the specification, the "ε-iron oxide powder" is to be understood to mean ferromagnetic powder from which an ε-iron oxide type crystal structure can be detected as a main phase by X-ray diffraction analysis. For example, when the diffraction peak with the highest intensity in an X-ray diffraction spectrum obtained by X-ray diffraction analysis is assigned to the ε-iron oxide type crystal structure, it shall be determined that the ε-iron oxide type crystal structure is detected as a main phase. As a method for producing ε-iron oxide powder, a method for producing ε-iron oxide powder from goethite and a reverse micelle method has been known. Both of the above-described production methods has been publicly known. Moreover, J. Jpn. Soc. Powder Metallurgy Vol. 61 Supplement, No. 51, pp. S280-S284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in a magnetic layer of the magnetic tape, however, is not limited to these methods.

The activation volume of the ε-iron oxide powder is preferably 300 to 1,500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$ and can also be, for example equal to or greater than 500 $nm^3$. In addition, from a viewpoint of further improving electromagnetic conversion characteristics, the activation volume of the ε-iron oxide powder is more preferably equal to or smaller than 1,400 $nm^3$, even more preferably equal to or smaller than 1,300 $nm^3$, still preferably equal to or smaller than 1,200 $nm^3$, and still more preferably equal to or smaller than 1,100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of ferromagnetic powder included in the magnetic recording medium is high. In regards to this point, in one aspect, σs of the ε-iron oxide powder can be equal to or greater than 8 $A \cdot m^2/kg$ and can also be equal to or greater than 12 $A \cdot m^2/kg$. On the other hand, from a viewpoint of noise reduction, σs of the ε-iron oxide powder is preferably equal to or smaller than 40 $A \cdot m^2/kg$ and more preferably equal to or smaller than 35 $A \cdot m^2/kg$.

Binding Agent

The magnetic tape includes a binding agent in the magnetic layer. As the binding agent, one or more kinds of resin is used. The resin may be a homopolymer or a copolymer. As the binding agent included in the magnetic layer, a material selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with a resin usable as the binding agent, in a case of forming the magnetic layer. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic tape. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent added can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer.

Additives

The magnetic layer may include a ferromagnetic powder and a binding agent, and, if necessary, include one or more kinds of additives. As the additives, the curing agent described above is used as an example. In addition, examples of the additive which can be included in the magnetic layer include a non-magnetic powder, a lubricant, a dispersing agent, a dispersing assistant, an antibacterial agent, an antistatic agent, an antioxidant, and carbon black. As the additives, a commercially available product can be suitably selected and used according to the desired properties. For example, for the lubricant, a description disclosed in paragraphs 0030 to 0033 and 0035 to 0036 of JP2016-126817A can be referred to. The non-magnetic layer may include a lubricant. For the lubricant which can be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

The magnetic layer preferably includes one kind or two or more kinds of non-magnetic powders. As the non-magnetic powder, a non-magnetic powder (hereinafter, referred to as a "projection formation agent") which can function as a projection formation agent which forms projections suitably protruded from the surface of the magnetic layer can be used. The projection formation agent is a component which can contribute to control of friction properties of the surface of the magnetic layer of the magnetic tape. In addition, the magnetic layer may include a non-magnetic powder (hereinafter, referred to as an "abrasive") which can function as an abrasive. The magnetic layer of the magnetic tape preferably includes at least one of the projection formation agent or the abrasive and more preferably includes both of them.

As the projection formation agent which is one aspect of the non-magnetic filler, various non-magnetic powders normally used as a projection formation agent can be used. These may be powder of an inorganic substance or powder of an organic substance. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the non-magnetic powder included in the magnetic layer is preferably powder of inorganic substances (inorganic powder). Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at any mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

Meanwhile, the abrasive is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. Regarding the particle size of the abrasive, a specific surface area which is an index of a particle size is, for example, equal to or greater than 14 $m^2/g$, preferably equal to or greater than 16 $m^2/g$, and more preferably equal to or greater than 18 m²/g. In addition, the specific surface area of the abrasive can be, for example, equal to or smaller than 40 m²/g. The specific surface area is a value obtained by a nitrogen adsorption method (also referred to as a Brunauer-Emmett-Teller (BET) one-point method). Hereinafter, the specific surface area obtained by such a method is also referred to as a BET specific surface area.

In addition, from a viewpoint that the projection formation agent and the abrasive can exhibit each function in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition.

As described above, in order to control the base friction to be equal to or smaller than 0.35, other non-magnetic powders can also be used, in addition to the non-magnetic powder described above. For such non-magnetic powder, non-magnetic powder having a Mohs hardness equal to or smaller than 8 is preferable, and various non-magnetic powders normally used in the non-magnetic layer can be used. Specifically, the non-magnetic layer is as described later. As more preferred non-magnetic powder, red oxide can be used. The Mohs hardness of red oxide is approximately 6.

It is preferable that the other non-magnetic powder described above has an average particle size greater than that of the ferromagnetic powder, in the same manner as the other ferromagnetic powder used with the ferromagnetic powder used with the largest proportion described above. This is because the base friction can decrease due to the protruded portion formed of the other non-magnetic powder on the base portion. From this viewpoint, a difference between an average particle size of the ferromagnetic powder and an average particle size of the other non-magnetic powder used therewith, acquired as "(latter average particle size)−(former average particle size)" is preferably 10 to 80 nm and more preferably 10 to 50 nm. In a case of using two or more kinds of ferromagnetic powders having different average particle sizes as the ferromagnetic powder, the ferromagnetic powder used for calculating the difference between the average particle size thereof and the average particle size of the other non-magnetic powder is a ferromagnetic powder used with the largest proportion among two or more kinds of ferromagnetic powders. As the other non-magnetic powder, it is also possible to use two or more kinds of non-magnetic powders having different average particle sizes. In this case, it is preferable that an average particle size of at least one of non-magnetic powder of the two or more of other non-magnetic powders satisfies the difference described above, it is more preferable that average particle sizes of more kinds of non-magnetic powders satisfy the difference described above, and it is even more preferable that average particle sizes of all of the non-magnetic powders satisfy the difference described above, with respect to the average particle size of the ferromagnetic powder.

From a viewpoint of controlling the base friction, a mixing ratio of the ferromagnetic powder to the other non-magnetic powder (in a case of using two or more kinds of non-magnetic powders having different average particle sizes as other non-magnetic powder, the total thereof) is preferably 90.0:10.0 (former:latter) to 99.9:0.1 and more preferably 95.0:5.0 to 99.5:0.5 based on mass.

Non-Magnetic Layer

Next, the non-magnetic layer will be described. The magnetic tape may directly include a magnetic layer on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black, which can be used in the non-magnetic layer, descriptions disclosed in paragraphs 0040 and 0041 of JP2010-024113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes one or both of carbon black and inorganic powder. In regards to the binding agent included in the back coating layer and various additives which can be randomly included in the back coating layer, a well-known technology regarding the back coating layer can be applied, and a well-known technology regarding the treatment of the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thickness

A thickness of the non-magnetic support is preferably 3.0 to 6.0 µm.

A thickness of the magnetic layer is preferably equal to or smaller than 0.15 µm and more preferably equal to or smaller than 0.1 µm, from a viewpoint of realization of high-density recording required in recent years. The thickness of the magnetic layer is even more preferably 0.01 to 0.1 µm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 µm and is preferably 0.1 to 1.0 µm.

A thickness of the back coating layer is preferably equal to or smaller than 0.9 µm and even more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

Preparation of Each Layer Forming Composition A step of preparing a composition for forming the magnetic layer, the non-magnetic layer, or the back coating layer generally includes at least a kneading step, a dispersing step, and a mixing step provided before and after these steps, if necessary. Each step may be divided into two or more stages. The component used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP-2011-216149A can be referred to, for example. In addition, each component may be separately added in two or more steps. For example, a binding agent may be separately added in a kneading step, a dispersing step, and a mixing step for adjusting viscosity after the dispersion. In order to manufacture the magnetic tape, a well-known manufacturing technology of the related art can be used in various steps. In the kneading step, a kneader having a strong kneading force such as an open kneader, a continuous kneader, a pressure kneader, or an extruder is preferably used. For the details of the kneading processes, descriptions of JP1989-106338A (JP-H01-106338A) and JP1989-079274A (JP-H01-079274A) can be referred to. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. In the aspect of performing the alignment process, while the coating layer of the magnetic layer forming composition is wet, an alignment process is performed with respect to the coating layer in an alignment zone. For the alignment process, various well-known technologies such as descriptions disclosed in a paragraph 0052 of JP2010-024113A can be used. For example, the homeotropic alignment process can be performed by a well-known method such as a method using a pole opposing magnet. In the alignment zone, a drying speed of the coating layer can be controlled depending on a temperature and an air flow of dry air and/or a transportation speed of the magnetic tape in the alignment zone. In addition, the coating layer may be preliminarily dried before the transportation to the alignment zone.

The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

A servo pattern can be formed on the magnetic layer of the magnetic tape. The formation of a servo pattern on the magnetic layer is performed by magnetizing a specific position of the magnetic layer with a servo pattern recording head (also referred to as a "servo write head"). A shape of the servo pattern and disposition thereof in the magnetic layer for realizing the tracking are well known, and the region magnetized by the servo write head (position where a servo pattern is formed) is determined by standards. In regards to the servo pattern of the magnetic layer of the magnetic tape, a well-known technology can be used. For example, as a tracking system, a timing-based servo system and an amplitude-based servo system are known. The servo pattern which can be formed on the magnetic layer of the magnetic tape may be a servo pattern capable of allowing tracking of any system. In addition, a servo pattern capable of allowing tracking in the timing-based servo system and a servo pattern capable of allowing tracking in the amplitude-based servo system may be formed on the magnetic layer.

Figure 14:
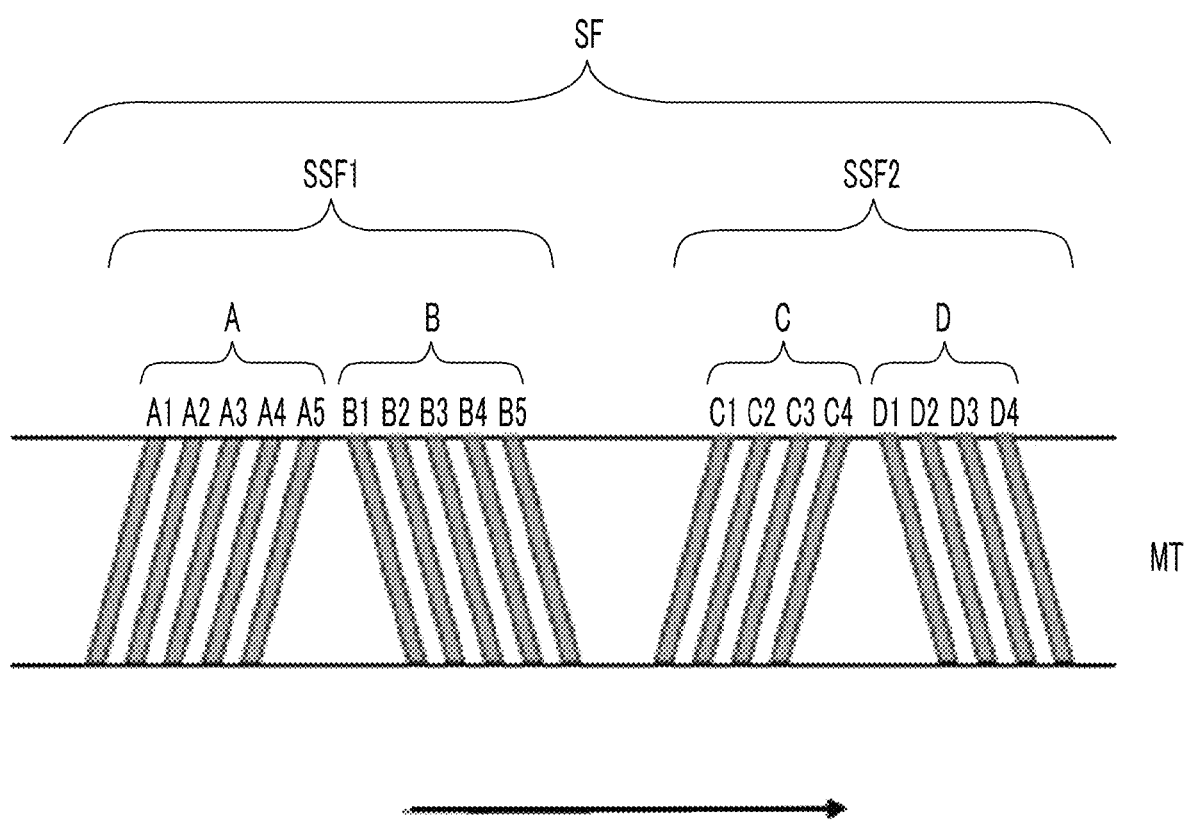
FIG. 14 shows a servo pattern disposition example of a linear-tape-open (LTO) Ultrium format tape.

In the magnetic tape, data is normally recorded on a data band of the magnetic tape. Accordingly, tracks are formed in the data band. Specifically, a plurality of regions including a servo pattern (referred to as "servo bands") are generally present in the magnetic tape along a longitudinal direction. The data band is a region interposed between two servo bands. For example, a track region 30 in FIG. 2 is a data band. The recording of data is performed on the data band, and a plurality of tracks are formed on the data band along the longitudinal direction. For example, in an LTO Ultrium format tape which is based on a local standard, a plurality of servo patterns tilted in a tape width direction as shown in FIG. 14 are formed on a servo band, in a case of manufacturing a magnetic tape. Specifically, in FIG. 14, a servo frame SF on the servo band is configured with a servo sub-frame 1 (SSF1) and a servo sub-frame 2 (SSF2). The servo sub-frame 1 is configured with an A burst (in FIG. 14, reference numeral A) and a B burst (in FIG. 14, reference numeral B). The A burst is configured with servo patterns A1 to A5 and the B burst is configured with servo patterns B1 to B5. Meanwhile, the servo sub-frame 2 is configured with a C burst (in FIG. 14, reference numeral C) and a D burst (in FIG. 14, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 14 shows one servo frame for description. However, in practice, in the magnetic layer of the magnetic tape in which the tracking is performed in the timing-based servo system, a plurality of servo frames are disposed in each servo band in a running direction. In FIG. 14, an arrow shows the running direction. For example, an LTO Ultrium format tape generally includes 5,000 or more servo frames per a tape length of 1 m, in each servo band of the magnetic layer. The servo element sequentially reads the servo patterns in the plurality of servo frames, while coming into contact with and sliding on the surface of the magnetic layer of the magnetic tape transported in the magnetic tape apparatus.

In the timing-based servo system, for example, the servo patterns are configured of consecutive alignment of a plurality of pairs of magnetic stripes (also referred to as "servo stripes"), in each pair of which magnetic stripes are not parallel with each other, in the longitudinal direction of the magnetic tape. Servo signals can be obtained by reading the servo stripes with the servo element.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA (European Computer Manufacturers Association)-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

The servo write head has the same number of pairs of gaps corresponding to the respective pairs of servo patterns as the number of servo bands. Generally, a core and a coil are connected to each pair of gaps, and a magnetic field generated in the core by supplying a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 μm or less, 1 to 10 μm, or 10 μm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

The magnetic tape described above is generally accommodated in a magnetic tape cartridge and the magnetic tape cartridge is mounted in the magnetic tape apparatus. The configuration of the magnetic tape cartridge is well known. For one aspect of the magnetic tape cartridge, the aforementioned description regarding the magnetic tape cartridge 12 in FIG. 1 can be referred to.

According to one aspect, the following magnetic tape is also provided.

A magnetic tape comprising:
a non-magnetic support; and
a magnetic layer including a ferromagnetic powder and a binding agent on the non-magnetic support,
in which a coefficient of friction measured regarding a base portion of a surface of the magnetic layer is equal to or smaller than 0.35.

According to one aspect, the following magnetic tape is also provided.

A magnetic tape used for recording data or reading the recorded data, the magnetic tape comprising:
a non-magnetic support; and
a magnetic layer including a ferromagnetic powder a binding agent on the non-magnetic support,
in which a coefficient of friction measured regarding a base portion of a surface of the magnetic layer is equal to or smaller than 0.35.

In one aspect, the reading of data may be performed by a reading element unit.

In one aspect, the reading element unit may include a plurality of reading elements each of which reads data by a linear scanning method from a specific track region including a reading target track in a track region included in the magnetic tape.

In one aspect, a reading result for each reading element may be extracted by an extraction unit.

In one aspect, the extraction unit may extract data derived from the reading target track from the reading result for each reading element.

In one aspect, the extraction unit may perform a waveform equalization process according to a deviation amount between positions of the magnetic tape and the reading element unit, with respect to each reading result for each reading element, to extract data derived from the reading target track from the reading result.

For specific aspects of the magnetic tape, the reading element unit, and the extraction unit, the aforementioned description can be referred to.

EXAMPLES

Hereinafter, the invention will be described with reference to examples. However, the invention is not limited to aspects shown in the examples. "Parts" and "%" in the following description mean "parts by mass" and "mass %", unless otherwise noted. "eq" in the following description is an equivalent which is a unit which cannot be converted into the SI unit system. In addition, steps and evaluations described below are performed in an environment of an atmosphere temperature of 23° C.±1° C., unless otherwise noted.

Example 1

A list of each layer forming composition is shown below.
List of Magnetic Layer Forming Composition Magnetic Liquid
Ferromagnetic powder: 100.0 parts
Ferromagnetic powder (1) and ferromagnetic powder (2) shown in Table 1 are used with the amounts shown in Table 1
Oleic acid: 2.0 parts
A vinyl chloride copolymer (MR-104 manufactured by Kaneka Corporation): 10.0 parts
$SO_3Na$ group-containing polyurethane resin: 4.0 parts
(Weight-average molecular weight: 70,000, $SO_3Na$ group: 0.07 meq/g)
Methyl ethyl ketone: 150.0 parts
Cyclohexanone: 150.0 parts
Abrasive Solution
α-Alumina: 6.0 parts
(BET specific surface area: 19 $m^2$/g, Mohs hardness: 9) $SO_3Na$ group-containing polyurethane resin: 0.6 parts
(Weight-average molecular weight: 70,000, $SO_3Na$ group: 0.1 meq/g)
2,3-dihydroxynaphthalene: 0.6 parts
Cyclohexanone: 23.0 parts
Projection Formation Agent Liquid
Colloidal silica: 2.0 parts
(Average particle size: 80 nm)
Methyl ethyl ketone: 8.0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder α-iron oxide: 100.0 parts
(Average particle size: 10 nm, BET specific surface area: 75 $m^2$/g)
Carbon black: 25.0 parts
(Average particle size: 20 nm)
A $SO_3Na$ group-containing polyurethane resin: 18.0 parts
(Weight-average molecular weight: 70,000, content of $SO_3Na$ group: 0.2 meq/g)
Stearic acid: 1.0 part
Cyclohexanone: 300.0 parts
Methyl ethyl ketone: 300.0 parts
List of Back Coating Layer Forming Composition
Non-magnetic inorganic powder α-iron oxide: 80.0 parts
(Average particle size: 0.15 μm, BET specific surface area: 52 $m^2$/g)
Carbon black: 20.0 parts
(Average particle size: 20 nm)
A vinyl chloride copolymer: 13.0 parts
A sulfonic acid salt group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition
The magnetic layer forming composition was prepared by the following method.

The magnetic liquid was kneaded by an open kneader and diluted, and subjected to a dispersion process of 30 passes, with a transverse beads mill dispersing device and zirconia ($ZrO_2$) beads (hereinafter, referred to as "Zr beads") having a bead diameter of 0.1 mm, by setting a bead filling percentage as 80 volume %, a circumferential speed of rotor distal end as 10 msec, and a retention time for 1 pass as 2 minutes.

Regarding the abrasive liquid, the components were mixed with each other and put in a transverse beads mill dispersing device together with the Zr beads having a bead diameter of 0.3 mm, to perform the adjustment so that a value of bead volume/(abrasive liquid volume+bead volume) was 80%, and a beads mill dispersion process was performed for 120 minutes. The liquid after the process was extracted, and an ultrasonic dispersion filtering process was performed by using a flow type ultrasonic dispersion filtering device.

The magnetic liquid, the abrasive liquid, the projection formation agent liquid, and the lubricant and curing agent liquid as the other component were introduced in a dissolver stirrer, and stirred at a circumferential speed of 10 msec for 30 minutes. Then, a process of 3 passes was performed at a flow rate of 7.5 kg/min with a flow type ultrasonic dispersing device, and then, the mixture was filtered with a filter having a hole diameter of 1 μm, to prepare a magnetic layer forming composition.

Preparation of Non-Magnetic Layer Forming Composition

Various components of the non-magnetic layer forming composition were dispersed for 24 hours by using Zr beads having a bead diameter of 0.1 mm with a batch type vertical sand mill, and filtered with a filter having a hole diameter of 0.5 μm, to prepare a non-magnetic layer forming composition.

Preparation of Back coating Layer Forming Composition

Various components of the back coating layer forming composition excluding lubricants (stearic acid and butyl stearate), polyisocyanate, and 200.0 parts of cyclohexanone were kneaded by an open kneader and diluted, and subjected to a dispersion process of 12 passes, with a transverse beads mill dispersing device and Zr beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, and the obtained dispersion liquid was filtered with a filter having a hole diameter of 1 μm, to prepare a back coating layer forming composition.

Manufacturing Magnetic Tape

The non-magnetic layer forming composition prepared as described above was applied onto a surface of a polyethylene naphthalate support having a thickness of 5.0 μm and dried so that the thickness after the drying becomes 1.0 μm, to form a non-magnetic layer. The magnetic layer forming composition prepared as described was applied on the surface of the formed non-magnetic layer so that the thickness after the drying becomes 0.1 μm, to form a coating layer. A homeotropic alignment process of applying a magnetic field having a magnetization field strength of 0.3 T in a vertical direction with respect to the surface of the coating layer was performed, while the coating layer of the magnetic layer forming composition is wet (not dried). After that, the coating layer was dried.

After that, the back coating layer forming composition prepared as described above was applied to the surface of the support opposite to the surface where the non-magnetic layer and the magnetic layer were formed, so that the thickness after the drying becomes 0.5 μm, and was dried. A calender process (surface smoothing treatment) was performed with respect to the tape obtained as described above by a calender configured of only a metal roll, at a speed of 100 m/min, linear pressure of 300 kg/cm (294 kN/m), and by using a calender roll at a surface temperature of 90° C., and then, a thermal treatment was performed in the environment of the atmosphere temperature of 70° C. for 36 hours. After the thermal treatment, the slitting was performed to have a width of ½ inches (0.0127 meters), and a magnetic tape was manufactured.

In a state where the magnetic layer of the manufactured magnetic tape was demagnetized, servo patterns having disposition and shapes according to the LTO Ultrium format were formed on the magnetic layer by using a servo write head. Accordingly, a magnetic tape including data bands, servo bands, and guide bands in the disposition according to the LTO Ultrium format in the magnetic layer, and including servo patterns having the disposition and the shape according to the LTO Ultrium format on the servo band is obtained.

Examples 2 to 7 and Comparative Examples 1 to 9

A magnetic tape was obtained in the same manner as in Example 1, except that various items shown in Table 1 were changed as shown in Table 1.

In Table 1, "BaFe" shown in a column of the ferromagnetic powder of the magnetic layer indicates hexagonal barium ferrite powder.

In Table 1, "SrFe" indicates hexagonal strontium ferrite powder prepared by the method disclosed in Example 14 of JP2015-127985A, except that a crystallization temperature of an amorphous body was changed. By changing the crystallization temperature, the average particle size was adjusted.

In Table 1, "ε-iron oxide" indicates ε-iron oxide powder prepared by the following method.

4.0 g of ammonia aqueous solution having a concentration of 25% was added to a material obtained by dissolving 6.3 g of iron (III) nitrate nonahydrate, 5.0 g of gallium (III) nitrate octahydrate, 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace was filled with the obtained precursor of ferromagnetic powder in the atmosphere and subjected to thermal treatment for 4 hours. The average particle size of the ε-iron oxide powder was adjusted by a furnace inner temperature of the heating furnace here.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the powder X-ray diffraction (XRD) was performed, and it was confirmed that the obtained ferromagnetic powder has a crystal structure of a single phase which is an ε phase not including a crystal structure of an α phase and a γ phase from the peak of the XRD pattern.

The amount of the ferromagnetic powder shown in Table 1 is a content of each ferromagnetic powder based on mass with respect to 100.0 parts by mass of a total of the ferromagnetic powder. An average particle size of the ferromagnetic powder shown in Table 1 is a value obtained by collecting a part from a batch of the powder used in the manufacturing of the magnetic tape and measuring an average particle size by the method described above.

Measurement of Base Friction

First, marking was performed on a measurement surface with a laser marker in advance, and an atomic force microscope (AFM) image of a portion separated from the mark by a certain distance (approximately 100 μm) was observed. The observation was performed regarding an area of a visual field of 7 μm×7 μm. At this time, marking was performed on the AFM by changing a cantilever to a hard material (single crystal silicon), so as to easily capture a scanning electron microscope (SEM) image of the same portion as will be described later. All of projections having a height equal to or greater than 15 nm from the reference surface were extracted from the AFM image observed as described above. A portion in which it is determined that projections were not present, was specified as a base portion, and the base friction was measured with TI-950 type TriboIndenter manufactured by Hysitron, Inc. by the method described above.

An SEM image of the same portion as the portion observed with the AFM image was observed to obtain a component map, and it was confirmed that the extracted projections having a height equal to or greater than 15 nm from the reference surface were projections formed of alumina or colloidal silica. In the examples and the comparative examples, in the component map obtained with the SEM, alumina and colloidal silica were not confirmed in the base portion.

Evaluation of Performance (1) The recording of data was performed on the magnetic layer of each magnetic tape of the examples and the comparative examples by using a recording and reproducing head mounted on TS1155 tape drive manufactured by IBM, under recording conditions of a rate of 6 m/s, a linear recording density of 600 kbpi (255 bit PRBS), and a track pitch of 2 μm. The unit kbpi is a unit of linear recording density (cannot be converted into SI unit system). The PRBS is an abbreviation of Pseudo Random Bit Sequence.

By the recording, a specific track region, where the reading target track is positioned, is formed on the magnetic layer of each magnetic tape between two adjacent tracks, that is, between a first noise mixing source track and a second noise mixing source track.

(2) The following data reading was performed as a model experiment of performing the data reading using the reading element unit including two reading elements disposed in adjacent state. In the following model experiment, the data reading was performed by bringing the surface of the magnetic layer and the reading element into contact with each other to slide on each other.

The reading was started in a state where the magnetic head including a single reading element was disposed so that the center of the reading target track in the tape width direction coincides with the center of the reading element in the track width direction, and a first data reading was performed. During this first data reading, the servo pattern was read by the servo element, and the tracking in the timing-based servo system was also performed. In addition, the data reading operation was performed by the reading element synchronously with the servo pattern reading operation.

Then, the position of the same magnetic head was deviated in the tape width direction (one adjacent track side) by 500 nm, and a second data reading was performed, in the same manner as in the first data reading. The two times of data reading described above were respectively performed under reading conditions of a reproducing element width of 0.2 μm, a rate of 4 m/s, and a sampling rate:bit rate of 1.25 times.

A reading signal obtained by the first data reading was input to an equalizer, and the waveform equalization process according to the deviation amount of the positions between the magnetic tape and the magnetic head (reading element) of the first data reading was performed. This waveform equalization process is a process performed as follows. A ratio between an overlapping region of the reading element and the reading target track and an overlapping region of the reading element and the adjacent track is specified from the deviation amount of the position obtained by reading the servo pattern formed at regular cycle by the servo element. A convolution arithmetic operation of a tap coefficient derived from this specific ratio using an arithmetic expression, was performed with respect to the reading signal, and accordingly, the waveform equalization process was performed. The arithmetic expression is an arithmetic expression in which Extended Partial Response class 4 (EPR4) is set as a reference waveform (target). Regarding a reading signal obtained in the second data reading, the waveform equalization process was performed in the same manner.

By performing a phase matching process of the two reading signals subjected to the waveform equalization process (hereinafter, referred to as "two-dimensional signal process"), a reading signal which was expected to be obtained by the reading element unit including two reading elements disposed in an adjacent state (reading element pitch=500 nm) was obtained. Regarding the reading signal obtained by doing so, an SNR at a signal detection point was calculated.

(3) The operation of (2) was repeated while performing track off-set of the position of the reading element at the start of the first data reading to the first noise mixing source track and the second noise mixing source track, respectively from the center of the reading target track in the tape width direction at interval of 0.1 μm, and an envelope of the SNR with respect to the track position was obtained.

In Table 1, in the examples and the comparative examples in which "performed" is disclosed in a column of the "two-dimensional signal process", the envelope of the SNR was obtained by the method described above.

In Table 1, in the comparative examples in which "none" is disclosed in a column of the "two-dimensional signal process", the second data reading was not performed, and the envelope of the SNR was obtained regarding the first data reading result (that is, data reading result obtained with only a single element).

(4) The envelope of the SNR of Comparative Example 1 was set as a reference envelope, and the SNR decreased from the SNR of the track center of the reference envelope by −3 dB was set as an SNR lower limit value. Regarding each envelope, the maximum track off-set amount equal to or greater than the lower limit value was set as allowable track off-set amount. In respective examples and the comparative examples, a rate of increase of the allowable track off-set amount with respect to the allowable track off-set amount of Comparative Example 1 was obtained as a "rate of increase of the allowable track off-set amount".

The results described above are shown in Table 1 (Tables 1-1 and 1-2).

As shown in Table 1, according to the examples, the rate of increase of the allowable track off-set amount equal to or greater than 20% could be realized.

A large allowable track off-set amount obtained by the method described above is advantageous, from a viewpoint of performing the reproducing with high reproducing quality, even with a small track margin. From this viewpoint, the rate of increase of the allowable track off-set amount is preferably equal to or greater than 20%.

One aspect of the invention is effective for usage of magnetic recording for which reproducing of data recorded with high density with high reproducing quality is desired.

What is claimed is:
1. A magnetic tape apparatus comprising:
a magnetic tape;
a reading element unit; and
an extraction unit,
wherein the magnetic tape includes a non-magnetic support, and a magnetic layer including a ferromagnetic powder and a binding agent on the non-magnetic support,

TABLE 1-1

|  | Example 1 | Example 2 | Example 3 | Example 4 | Example 5 | Example 6 | Example 7 |
|---|---|---|---|---|---|---|---|
| Kind of ferromagnetic powder (1) | BaFe | BaFe | BaFe | SrFe | SrFe | ε-iron oxide | ε-iron oxide |
| Average particle size of ferromagnetic powder (1) | 22 nm | 22 nm | 22 nm | 20 nm | 20 nm | 18 nm | 18 nm |
| Amount of ferromagnetic powder (1) | 99.5% | 99.0% | 98.5% | 99.5% | 98.5% | 99.5% | 98.5% |
| Kind of ferromagnetic powder (2) | BaFe | BaFe | BaFe | SrFe | SrFe | ε-iron oxide | ε-iron oxide |
| Average particle size of ferromagnetic powder (2) | 65 nm | 60 nm | 60 nm | 65 nm | 60 nm | 65 nm | 60 nm |
| Percentage of ferromagnetic powder (2) | 0.5% | 1.0% | 1.5% | 0.5% | 1.5% | 0.5% | 1.5% |
| Base friction | 0.35 | 0.30 | 0.20 | 0.32 | 0.18 | 0.32 | 0.15 |
| Two-dimensional signal process | Performed | Performed | Performed | Performed | Performed | Performed | Performed |
| Rate of increase of allowable track off-set amount (%) | 20 | 25 | 30 | 22 | 32 | 23 | 35 |

TABLE 1-2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Kind of ferromagnetic powder (1) | BaFe | BaFe | BaFe | SrFe | SrFe | SrFe | ε-iron oxide | ε-iron oxide | ε-iron oxide |
| Average particle size of ferromagnetic powder (1) | 22 nm | 22 nm | 22 nm | 20 nm | 20 nm | 20 nm | 18 nm | 18 nm | 18 nm |
| Amount of ferromagnetic powder (1) | 100% | 100% | 99.0% | 100% | 100% | 99% | 100% | 100% | 99.0% |
| Kind of ferromagnetic powder (2) | — | — | BaFe | — | — | SrFe | — | — | ε-iron oxide |
| Average particle size of ferromagnetic powder (2) | — | — | 60 nm | — | — | 60 nm | — | — | 60 nm |
| Percentage of ferromagnetic powder (2) | — | — | 1.0% | — | — | 1% | — | — | 1.0% |
| Base friction | 0.45 | 0.45 | 0.30 | 0.45 | 0.45 | 0.32 | 0.45 | 0.45 | 0.30 |
| Two-dimensional signal process | None | Performed | None | None | Performed | None | None | Performed | None |
| Rate of increase of allowable track off-set amount (%) | 0 | 14 | 2 | 2 | 15 | 4 | 4 | 16 | 5 | the coefficient of friction measured regarding a base portion of a surface of the magnetic layer is equal to or smaller than 0.35, the reading element unit includes a plurality of reading elements each of which reads data by a linear scanning method from a specific track region including a reading target track in a track region included in the magnetic tape, the extraction unit performs a waveform equalization process according to a deviation amount between positions of the magnetic tape and the reading element unit, with respect to each reading result for each reading element, to extract data derived from the reading target track from the reading result, and parts of the plurality of reading elements are overlapped each other in a running direction of the magnetic tape.

2. The magnetic tape apparatus according to claim 1,
wherein the specific track region is a region including the reading target track and adjacent tracks which are adjacent to the reading target track, and
each of the plurality of reading elements straddles over both of the reading target track and the adjacent track, in a case where a positional relationship with the magnetic tape is changed.

3. The magnetic tape apparatus according to claim 1,
wherein the plurality of reading elements are disposed in a line in a state of being adjacent to each other, in a width direction of the magnetic tape.

4. The magnetic tape apparatus according to claim 1,
wherein the plurality of reading elements fall in the reading target track in a width direction of the magnetic tape.

5. The magnetic tape apparatus according to claim 2,
wherein the waveform equalization process is performed by using a tap coefficient determined in accordance with the deviation amount.

6. The magnetic tape apparatus according to claim 5,
wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

7. The magnetic tape apparatus according to claim 3,
wherein the waveform equalization process is performed by using a tap coefficient determined in accordance with the deviation amount.

8. The magnetic tape apparatus according to claim 7,
wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

9. The magnetic tape apparatus according to claim 4,
wherein the waveform equalization process is performed by using a tap coefficient determined in accordance with the deviation amount.

10. The magnetic tape apparatus according to claim 9,
wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

11. The magnetic tape apparatus according to claim 1,
wherein the deviation amount is determined in accordance with a result obtained by reading a servo pattern applied to the magnetic tape in advance, by a servo element.

12. The magnetic tape apparatus according to claim 11,
wherein a reading operation by the reading element unit is performed synchronously with a reading operation by the servo element.

13. The magnetic tape apparatus according to claim 1,
wherein the extraction unit includes a two-dimensional FIR filter, and the two-dimensional FIR filter composes each result obtained by performing the waveform equalization process with respect to each reading result for each reading element, to extract data derived from the reading target track from the reading result.

14. The magnetic tape apparatus according to claim 1,
wherein the plurality of reading elements are a pair of reading elements.

15. The magnetic tape apparatus according to claim 1,
wherein the coefficient of friction measured regarding the base portion of the surface of the magnetic layer is 0.10 to 0.35.

16. A magnetic tape apparatus comprising:
a magnetic tape;
a reading element unit; and
an extraction unit,
wherein the magnetic tape includes a non-magnetic support, and a magnetic layer including a ferromagnetic powder and a binding agent on the non-magnetic support,
the coefficient of friction measured regarding a base portion of a surface of the magnetic layer is equal to or smaller than 0.35,
the reading element unit includes a plurality of reading elements each of which reads data by a linear scanning method from a specific track region including a reading target track in a track region included in the magnetic tape,
the extraction unit performs a waveform equalization process according to a deviation amount between positions of the magnetic tape and the reading element unit, with respect to each reading result for each reading element, to extract data derived from the reading target track from the reading result, and
the waveform equalization process is performed by using a tap coefficient determined in accordance with the deviation amount.

17. The magnetic tape apparatus according to claim 16,
wherein, regarding each of the plurality of reading elements, a ratio between an overlapping region with the reading target track and an overlapping region with an adjacent track which is adjacent to the reading target track is specified from the deviation amount, and the tap coefficient is determined in accordance with the specified ratio.

* * * * *